Aug. 15, 1944.   E. P. BULLARD, 3D., ET AL   2,355,625
MACHINE TOOL
Filed July 16, 1940   14 Sheets-Sheet 4

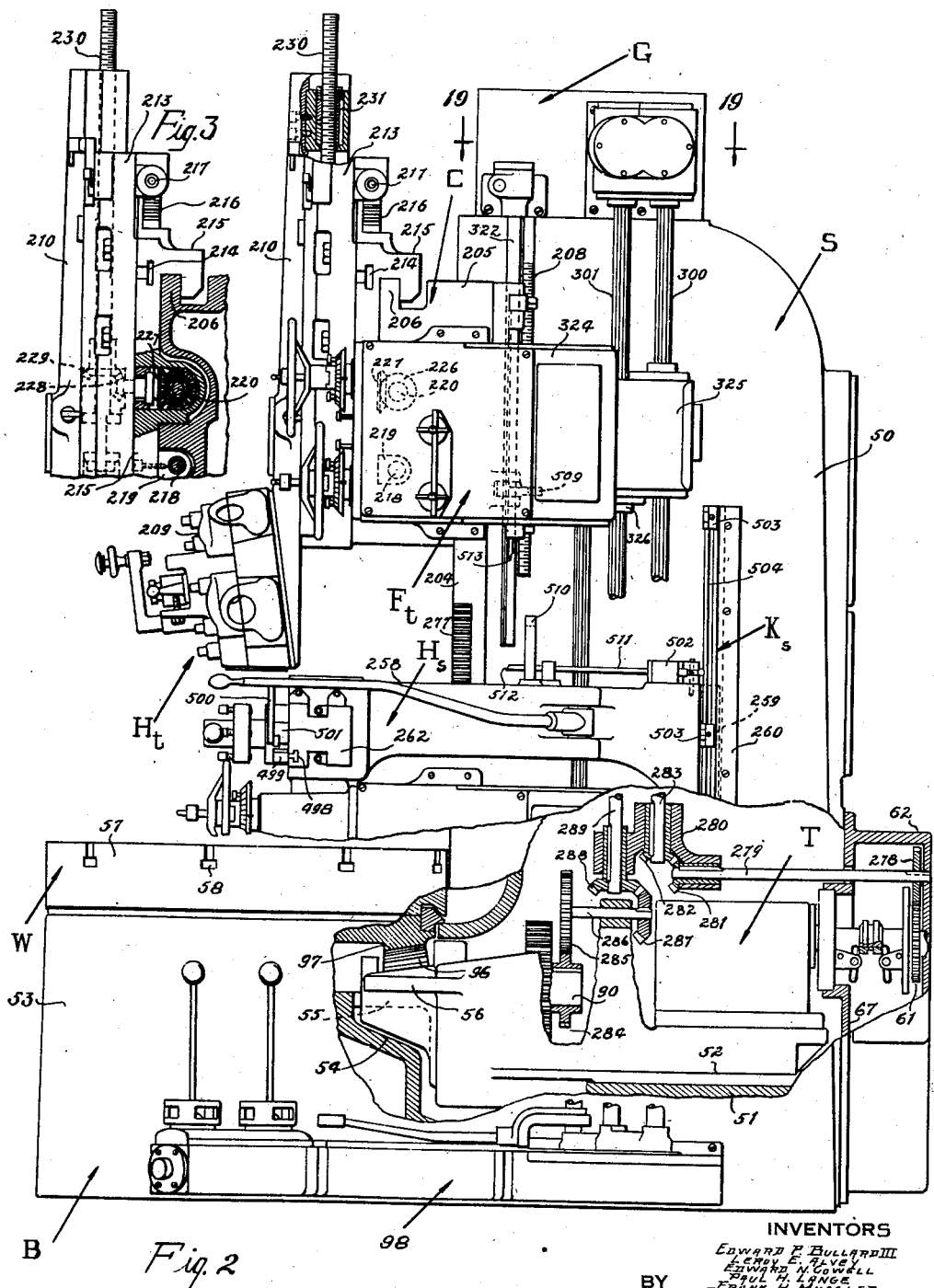

INVENTORS
Edward P. Bullard III
Leroy E. Alvey
Edward N. Cowell
Paul H. Lange
Frank H. Mussler
BY Paul M. Geist
ATTORNEY Aug. 15, 1944.　　E. P. BULLARD, 3D., ET AL　　2,355,625
MACHINE TOOL
Filed July 16, 1940　　14 Sheets-Sheet 5

INVENTORS
Edward P. Bullard III
Leroy E. Alvey
Edward N. Cowell
Paul H. Lange
Frank H. Mussler
BY
Paul M. Geist
ATTORNEY

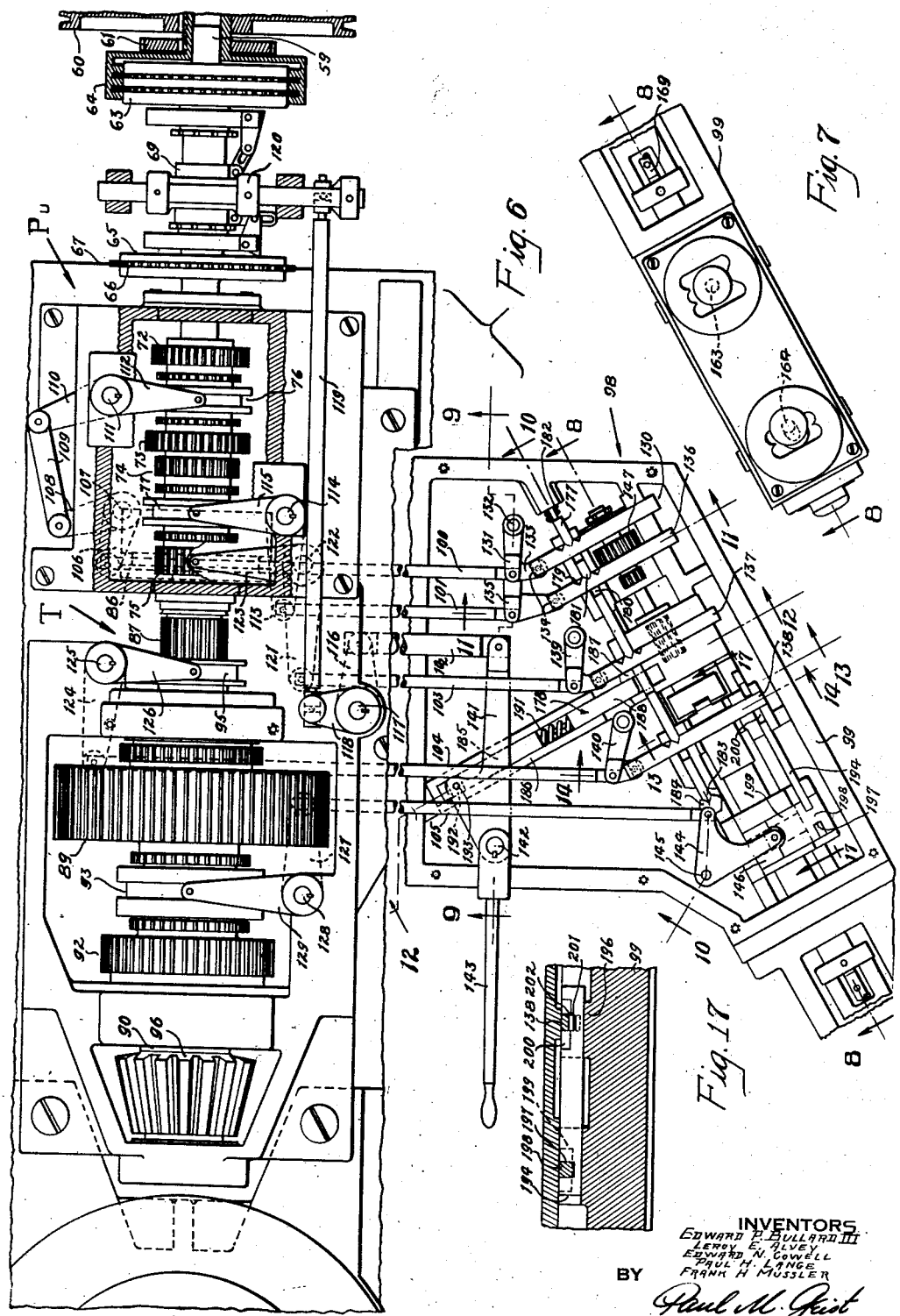

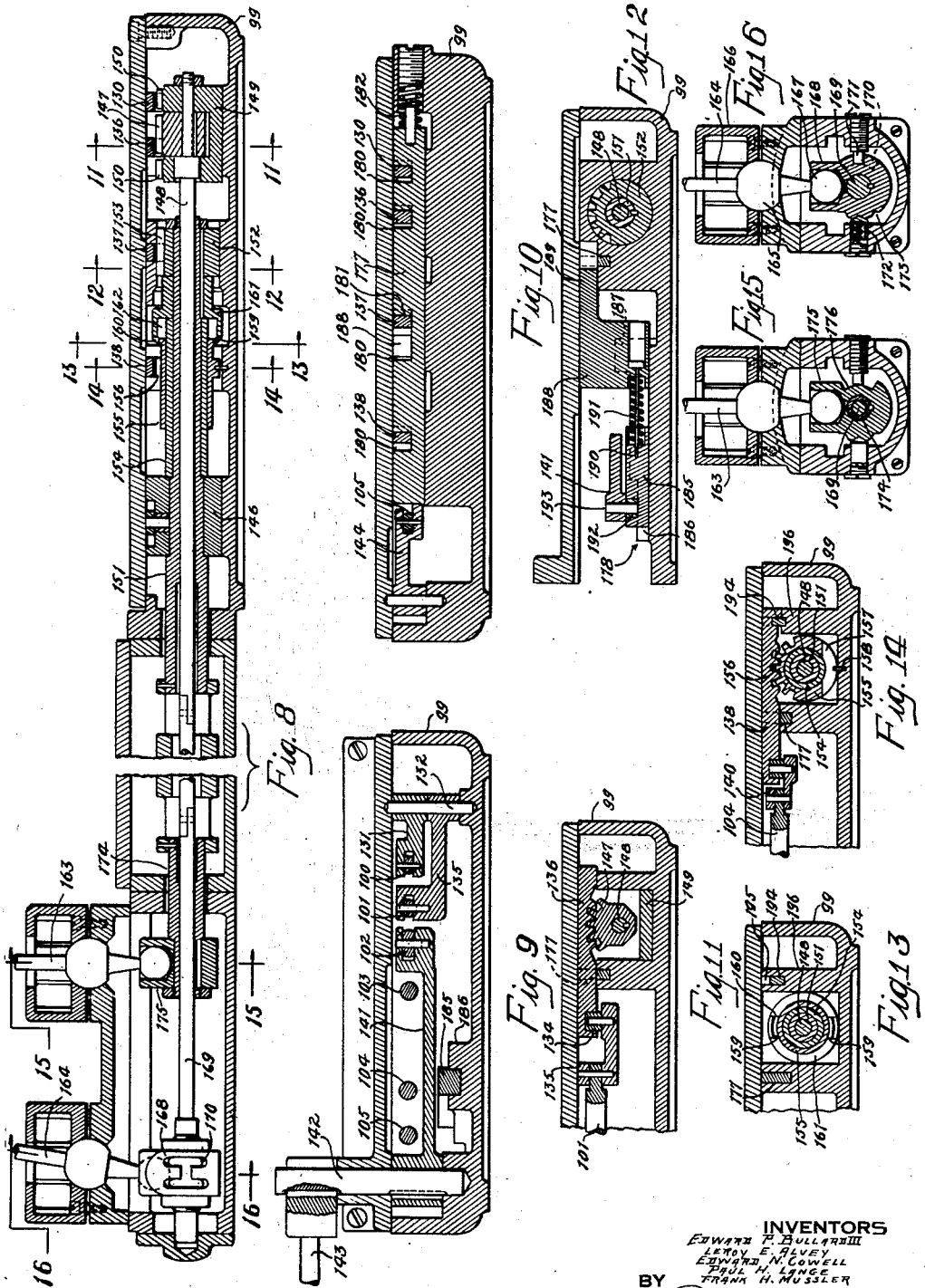

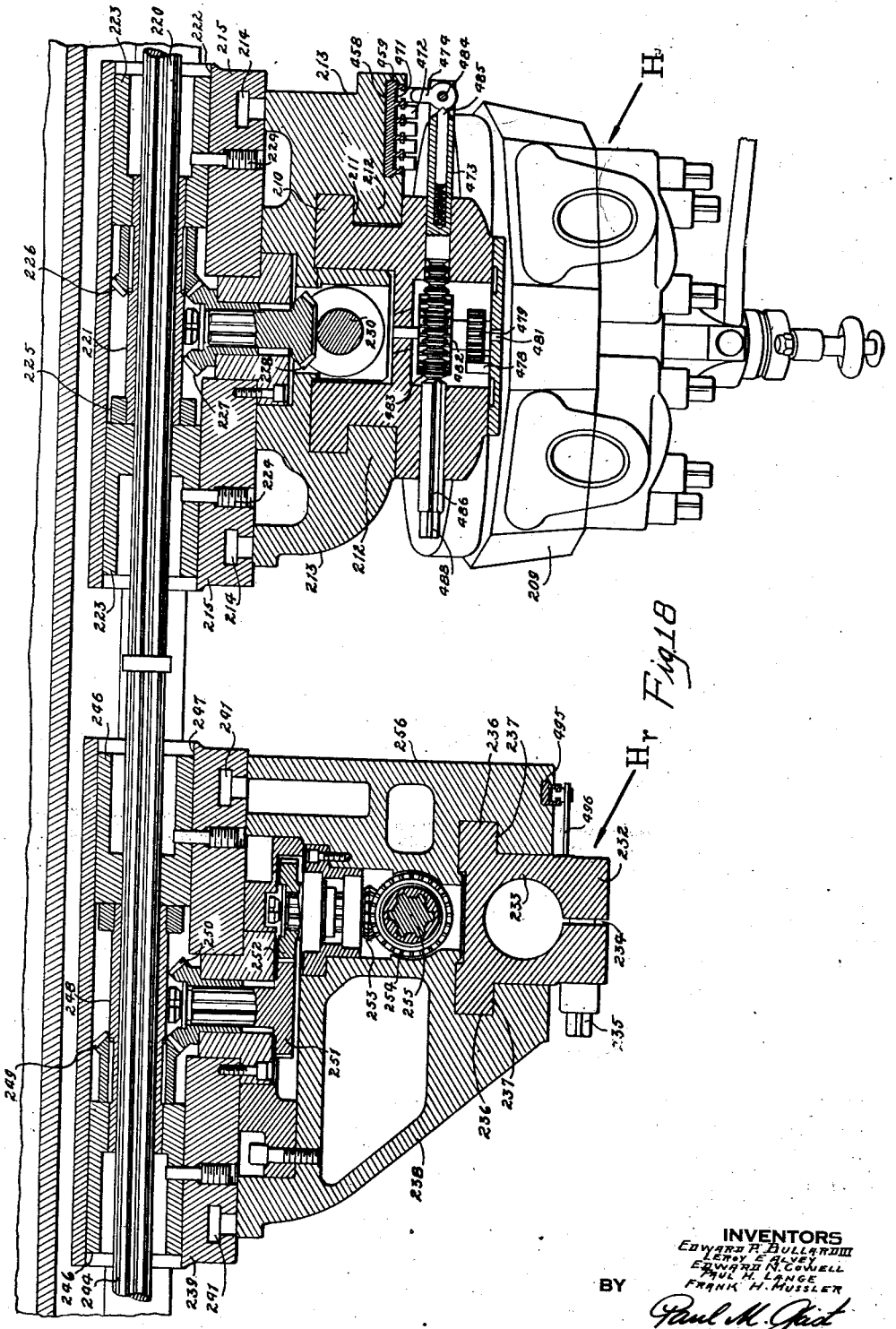

Aug. 15, 1944.  E. P. BULLARD, 3D., ET AL  2,355,625
MACHINE TOOL
Filed July 16, 1940  14 Sheets-Sheet 10

INVENTORS
EDWARD P. BULLARD III
LEROY E. ALVEY
EDWARD N. CONWELL
PAUL A. LANGE
FRANK H. MUSSLER
BY
Paul M. Geist
ATTORNEY INVENTORS
EDWARD P. BULLARD III
LEROY E. ALVEY
EDWARD N. COWELL
PAUL H. LANGE
FRANK H. MUSSLER
BY
Paul M. Geist
ATTORNEY

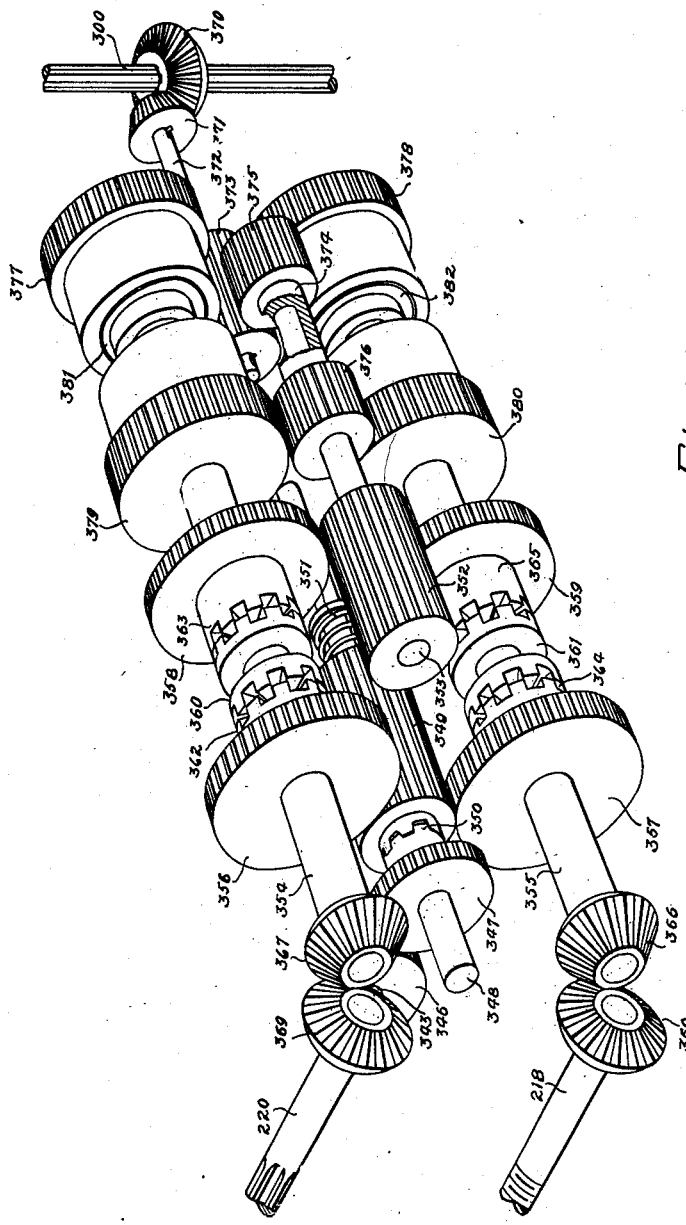

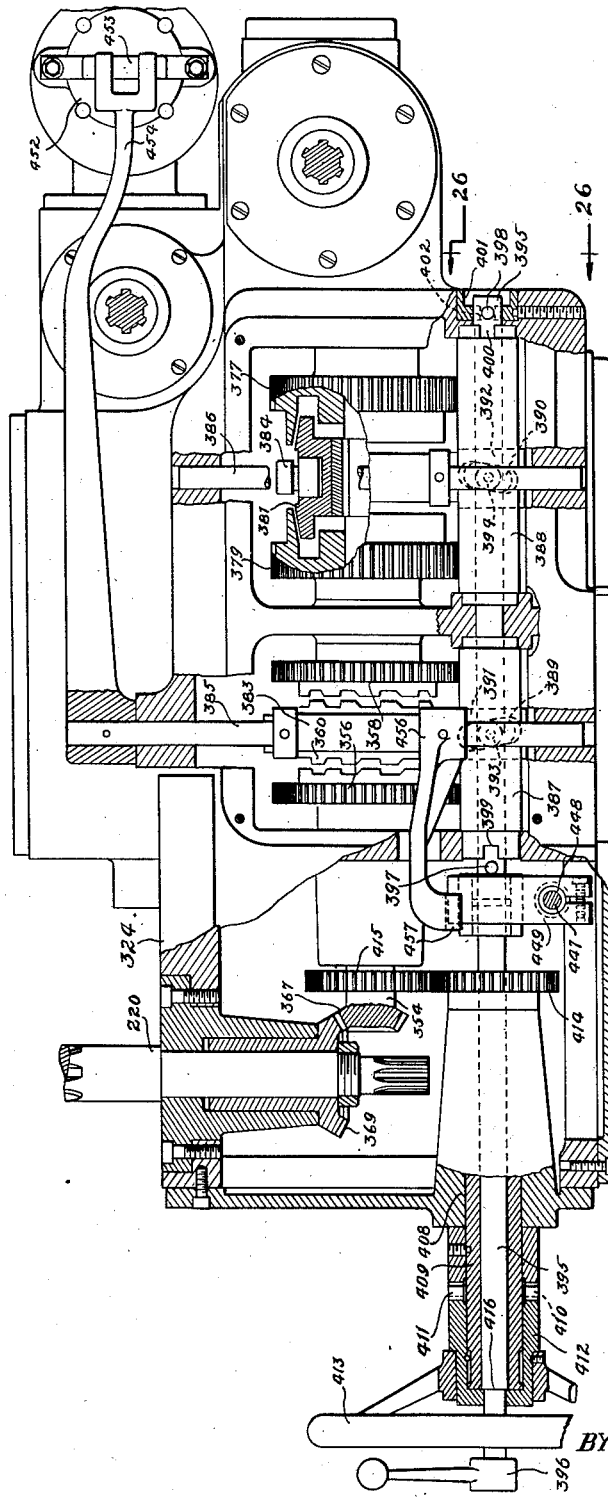

Aug. 15, 1944.  E. P. BULLARD, 3D., ET AL  2,355,625
MACHINE TOOL
Filed July 16, 1940    14 Sheets-Sheet 14

INVENTORS
EDWARD P. BULLARD III
LEROY E. ULVEY
EDWARD N. COWELL
PAUL H. LANGE
FRANK N. MUSSLER

BY
Paul M. Geist
ATTORNEY

Patented Aug. 15, 1944

2,355,625

UNITED STATES PATENT OFFICE 2,355,625

MACHINE TOOL

Edward P. Bullard, III, Fairfield, Frank H. Mussler, Stratford, Paul H. Lange, Bridgeport, Edward N. Cowell, Stratford, and Leroy E. Alvey, Bridgeport, Conn., assignors to The Bullard Company, a corporation of Connecticut Application July 16, 1940, Serial No. 345,772

86 Claims. (Cl. 29—29)

This invention relates to machine tools, and particularly to the class of machine tools that are capable of performing numerous operations either independently or simultaneously on work.

Although the principles of the invention may be applied to many types of machine tools, they will be shown and described as applied to the class including lathes and boring mills.

Among the objects of this invention include, the provision of a machine tool having a spindle drive, and a housing therefor rigidly secured substantially wholly within the frame of the machine in a manner to prevent its twisting due to the torque developed between the drive and the spindle during operation; the provision of a variable-speed transmission for a machine tool in which constantly meshing gear combinations are provided that are adapted to be engaged and disengaged by internal-external positive-action clutches so as not to impair the quietness or smooth operation of the transmission; the provision of a variable-speed transmission for a machine tool having less gears than the number of speeds the transmission is capable of producing, and in which all speeds are in geometrical proportion; the provision of a machine tool having a variable-speed transmission for a work-supporting table, and gear shifting levers for the transmission located in a position convenient for the operator but out of the way of the table; the provision of a machine tool having a variable-speed transmission in which the main clutch can be engaged only when a gear train is fully meshed; the provision of a machine tool having a feed-works transmission for each tool-supporting head, all of which are interchangeable; the provision of a feed-works transmission for a machine tool having a common lever for engaging the forward or reverse feed and traverse drives for each path along which the tool support is adapted to be moved; the provision of a feed-works transmission for a machine tool having hand wheels for manual control of the tool heads, and feed and traverse clutch shifting levers arranged along the axes of the hand wheels; the provision of a variable-speed feed-works transmission including sliding gears for varying the rate at which the tool supports are fed; the provision of a machine tool feed-works transmission including an interlock to prevent the engagement of the feed or traverse clutch when the other is in engagement; the provision of a feed-works transmission for a machine tool having manually-operable hand wheels that are automatically disengaged from the transmission when the latter is set for moving the tool support at traverse speed; the provision of a feed-works transmission having axially-shiftable oscillatable means for changing the feed of the transmission and located in a position readily observed and reached from the normal position of the operator; the provision of a machine tool having a plurality of tool supports each adapted to be moved along intersecting paths by a feed-works transmission and having shift levers, the directional movements of which correspond to the direction of movement of the tool supports; the provision of a machine tool in which the tool heads are adapted to be moved along intersecting paths, and in which they can be moved along a line that bisects the angle between said paths by simultaneously engaging the feed drives for moving said tool heads along each of their paths; the provision of a machine tool having a plurality of tool supports, the movements of which are automatically stopped at any predetermined points along their paths of travel; the provision of a machine tool in which all feeds for the tool heads may be engaged and disengaged, and their direction of operation changed while the work-supporting spindle is rotating; the provision of a lathe having a cross-rail for supporting one or more tool heads which rail can be raised and lowered while the machine is operating; and the provision of a lathe having such a cross-rail, the movement of which will automatically stop when it reaches a predetermined high or low point, and if it should approach too near the side head of the lathe.

The above, as well as other objects and novel features of the invention will become apparent from the following specification and accompanying drawings, in which:

Figure 2 is a side elevational view of the lathe shown in Figure 1, certain parts being removed and others being broken away to illustrate features of the invention;

Figure 3 is an elevational view of a portion of the lathe shown in Figure 2 with certain parts broken away to show a detail of construction;

Figure 1:
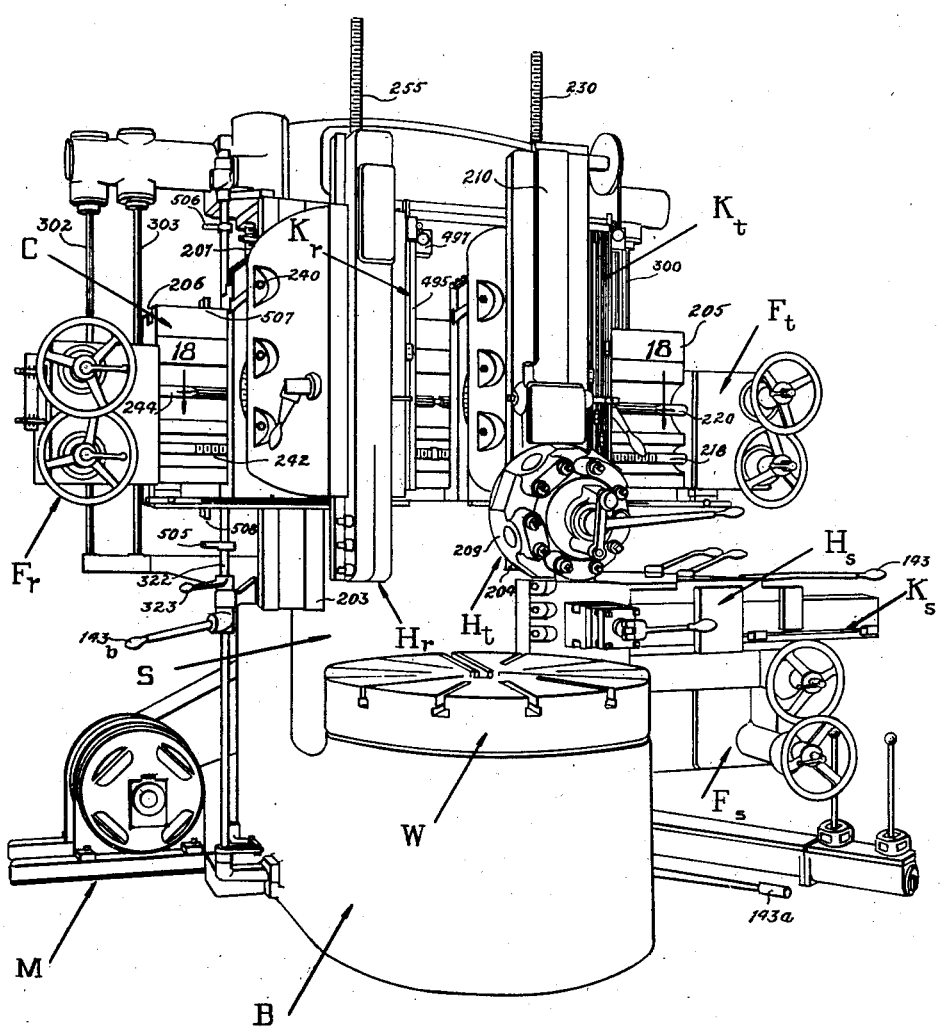
Figure 1 is a perspective view of a vertical turret lathe to which the principles of the invention have been applied.
Figure 4:
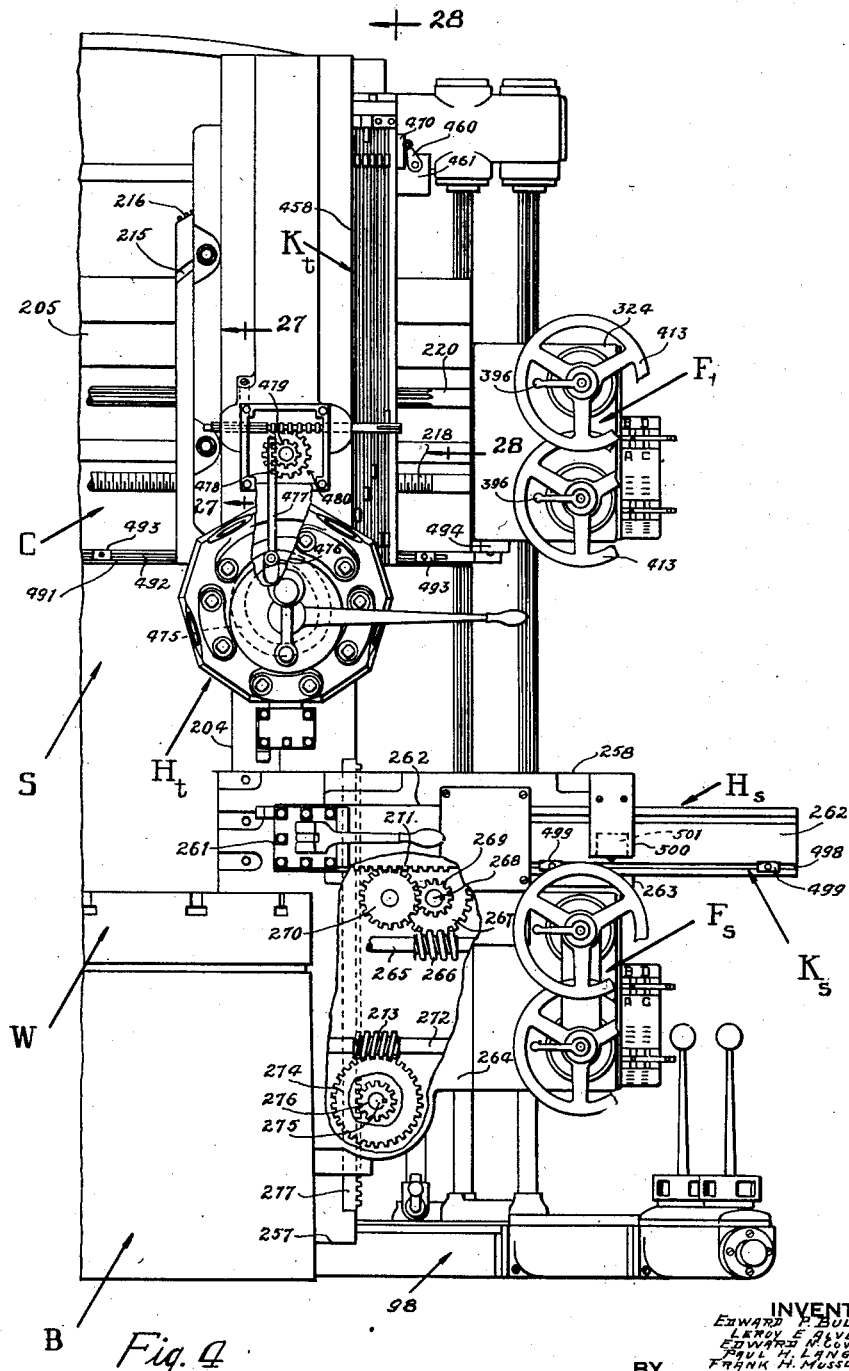
Figure 4 is a front elevational view of a portion of the lathe shown in Figure 1, parts being broken away to disclose the drive for the side head.
Figure 4A:
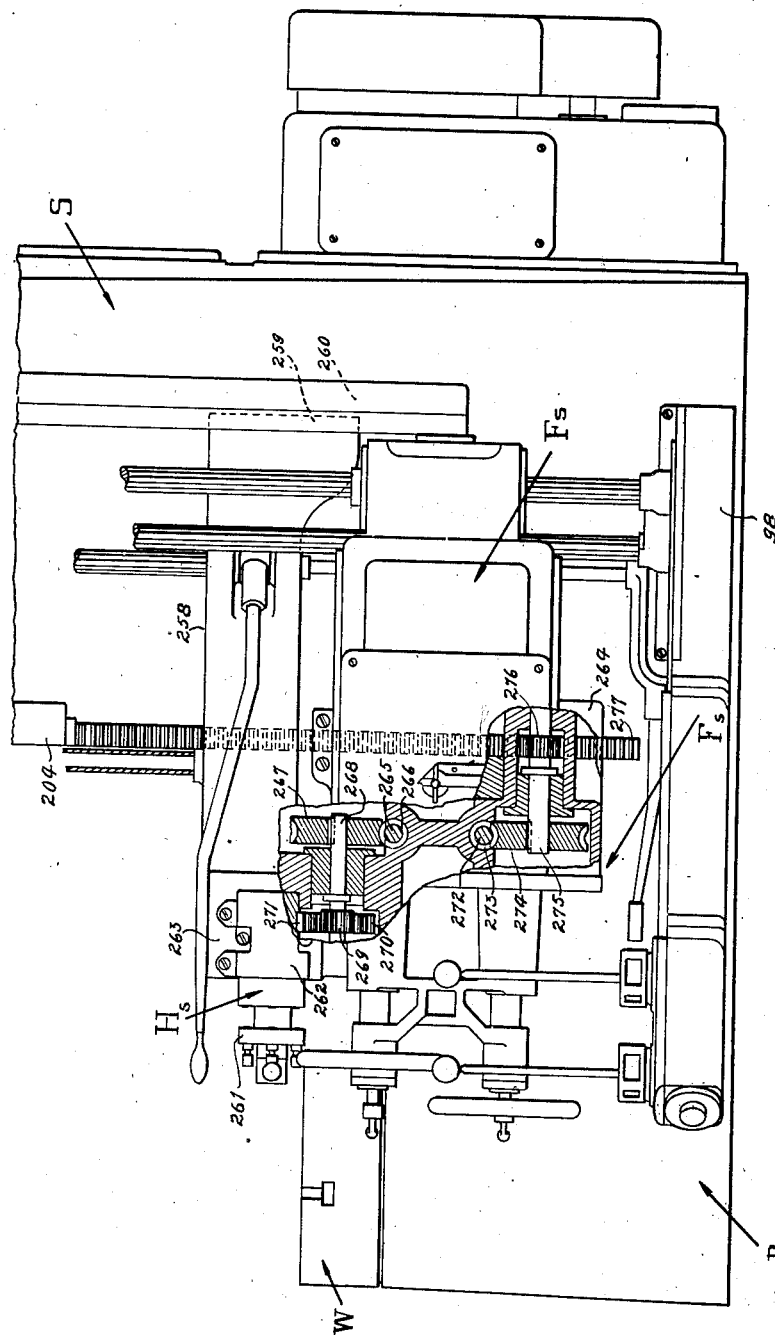
Figure 5:
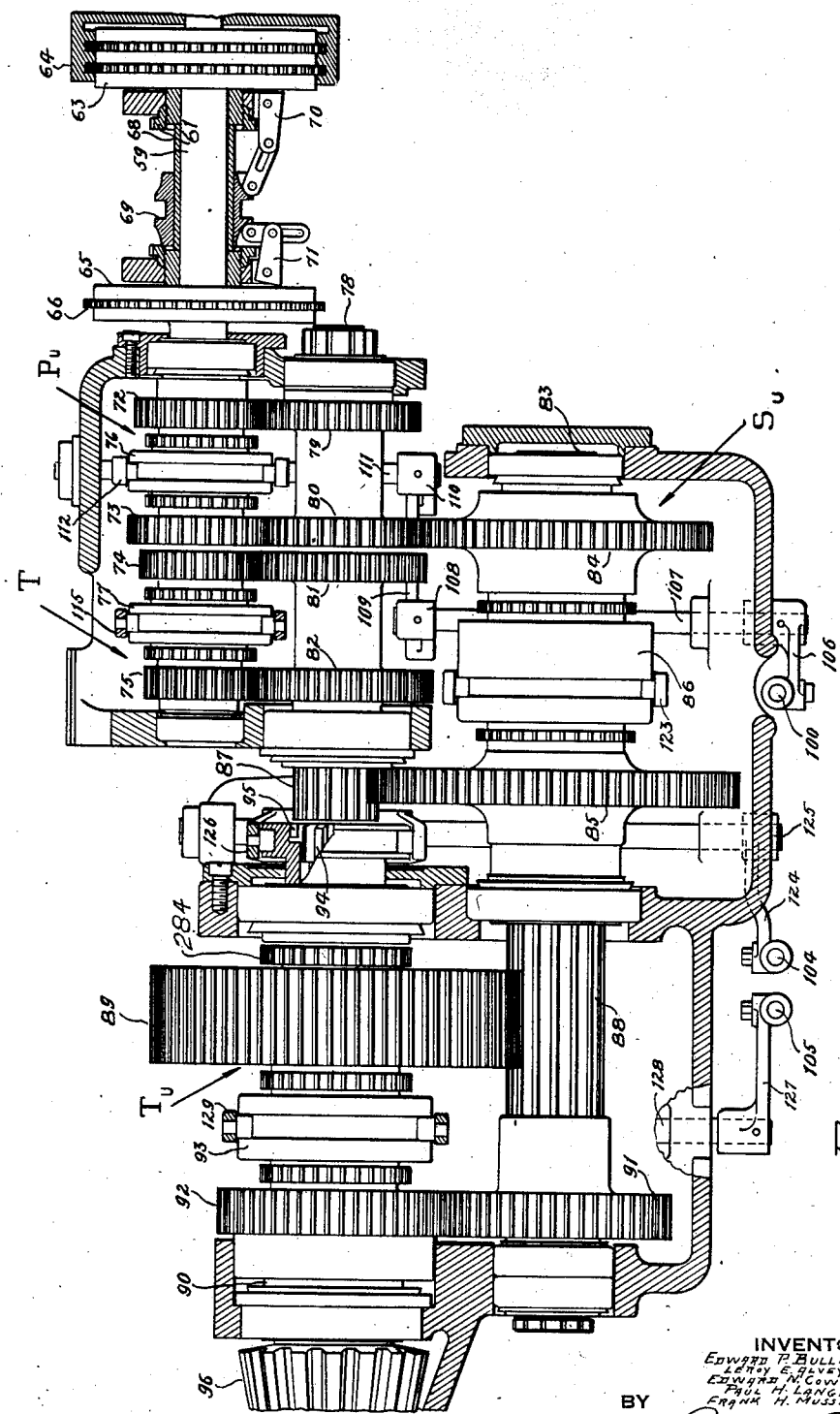
Figure 23:
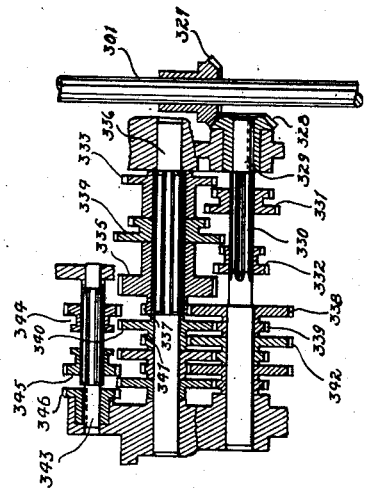
Figure 19:
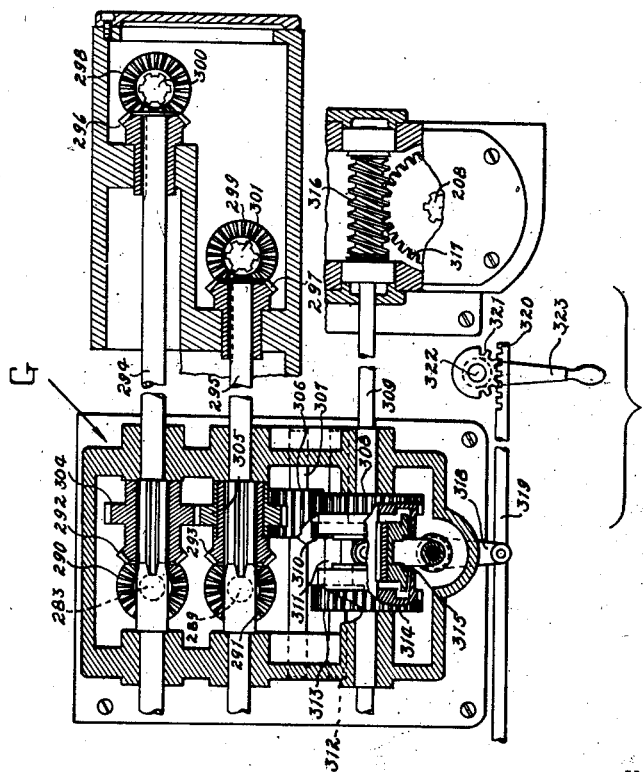
Figure 20:
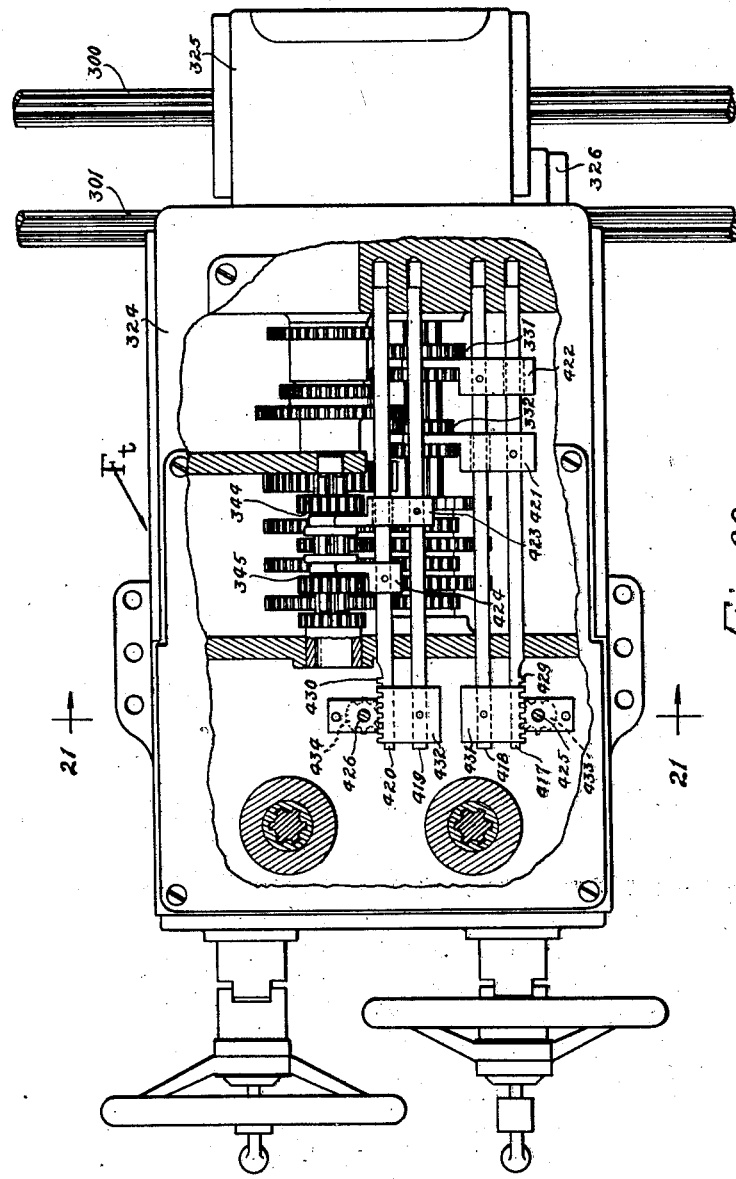
Figure 21:
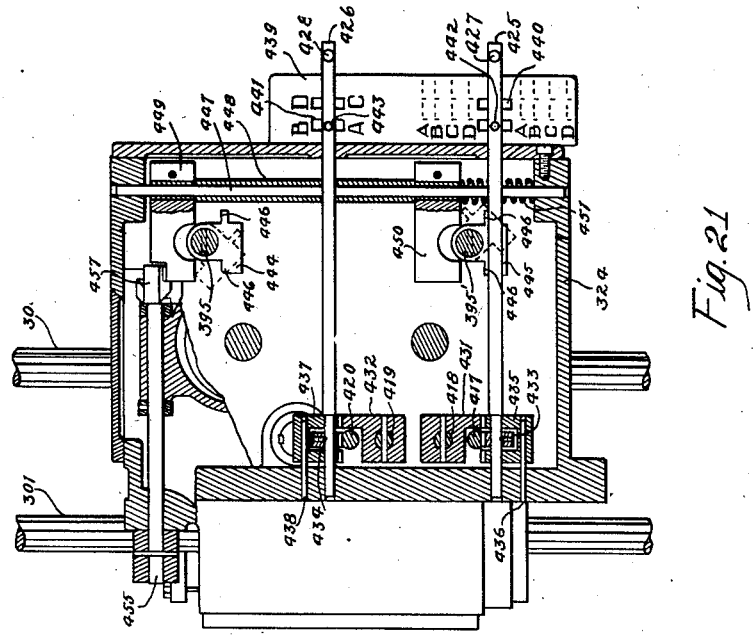
Figure 22:
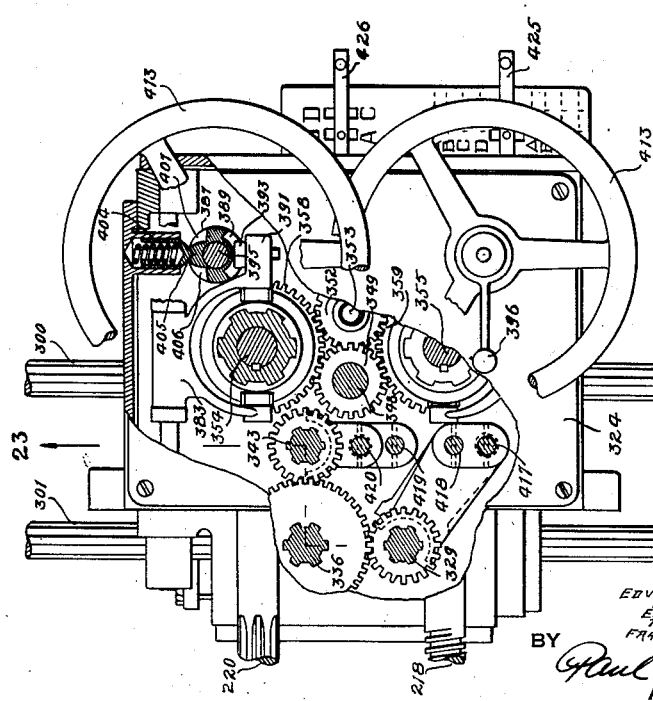

Figure 4—A is a side elevational view of a portion of the lathe of Figure 1, showing the drive for the side head;

Figure 5 is a sectional elevational view of the head stock transmission for the work-supporting table of the lathe shown in Figure 2;

Figure 6 is a top plan view of the headstock transmission shown in Figure 5, and of its gear shifting mechanism;

Figure 7 is a top plan view of the gear-shift lever arrangement for the gear shifting mechanism of Figure 6;

Figure 8 is a sectional elevational view taken substantially along the lines 8—8 of Figures 6 and 7;

Figure 9 is a sectional elevational view taken substantially along line 9—9 of Figure 6;

Figure 10 is a sectional elevational view taken substantially along line 10—10 of Figure 6;

Figure 11 is a sectional elevational view taken substantially along lines 11—11 of Figures 6 and 8;

Figure 12 is a sectional elevational view taken substantially along line 12—12 of Figure 6;

Figure 13 is a sectional elevational view taken substantially along lines 13—13 of Figures 6 and 8;

Figure 14 is a sectional elevational view taken substantially along lines 14—14 of Figures 6 and 8;

Figure 15 is a sectional elevational view taken substantially along line 15—15 of Figure 8;

Figure 16 is a sectional elevational view taken substantially along line 16—16 of Figure 8;

Figure 17 is a sectional elevational view taken substantially along line 17—17 of Figure 6;

Figure 18 is a sectional plan view taken substantially along line 18—18 of Figure 1;

Figure 19 is a sectional elevational view taken substantially along the line 19—19 of Figure 2;

Figure 20 is a side elevational view of the feed-works $F_t$ of Figure 2, the side plate being broken away and certain elements omitted to clearly show certain features of the invention;

Figure 21 is a sectional elevational view taken substantially along line 21—21 of Figure 20;

Figure 22 is a front elevational view of the feed-works $F_t$ of Figure 2, certain parts being broken away, and others omitted to clearly show certain features of the invention;

Figure 23 is a stretch out sectional view taken substantially along line 23—23 of Figure 22;

Figure 24 is a perspective view of the internal gearing of the feed-works $F_t$.

Figure 26:
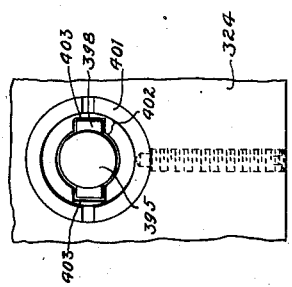

Figure 25 is a top plan view of the feed-works $F_t$ of Figure 2, parts being broken away and removed to disclose features of the invention;

Figure 26 is an elevational view as viewed along line 26—26 of Figure 25.

Figure 27:
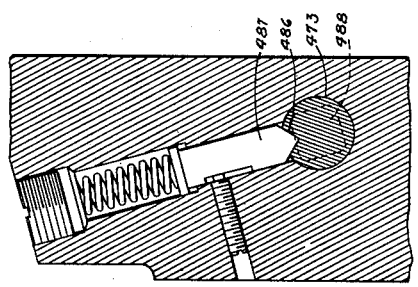
Figure 28:
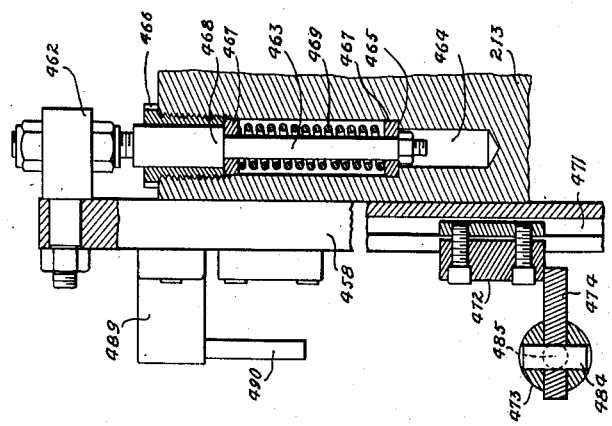

Figure 27 is a sectional elevational view taken substantially along line 27—27 of Figure 4; and Figure 28 is a sectional elevational view taken substantially along line 28—28 of Figure 4.

General organization

Referring to the drawings and particularly to Figs. 1, 2 and 4, the principles of the invention are shown as applied to a vertical turret lathe comprising a standard S to the bottom of which a base B is integrally connected. A rotatable work-supporting table W is mounted on the base B and is provided with a spindle suitably journaled in bearings within the base. Referring to Figure 2, a headstock transmission T is mounted substantially wholly within the lower part of the standard S, driven by a motor M (Fig. 1) and adapted to rotate the table W at a plurality of speeds.

A cross-rail C is mounted on the front of the standard S and supports a ram-head $H_r$ and a turret head $H_t$. The rail C is adapted to be moved vertically along the standard S, while the heads $H_r$ and $H_t$ are individually adapted to be moved along intersecting paths. The movements of the heads $H_r$ and $H_t$ are controlled by separate variable-speed feed-works transmissions $F_r$ and $F_t$ mounted on opposite ends of the cross-rail C. A side-head $H_s$ is mounted on one front corner and side of the standard S and it is adapted to be moved vertically and horizontally by an additional feed-works transmission $F_s$.

All of the feed-works are standardized so that identical constructions are employed. They are all interchangeable although the bracket for the feed-works $F_r$ is left-handed rather than right. The transmission T (Fig. 2) supplies power for all the feed-works through suitable gearing and shafting that extends upwardly from the center of the standard S to a gear bracket G on the top thereof, thence outwardly to each side of the machine where the shafting is connected to a pair of vertically-disposed splined shafts that extend downwardly on the one side through both feed-works $F_t$ and $F_s$ (Fig. 4) and on the other side through the feed-works $F_r$ (Fig. 1). The gear bracket G also includes a clutch-operated mechanism for controlling the vertical movement of the rail C along the standard S.

An intercontrol is provided for preventing the rail C being moved either upwardly beyond a definite limit or downwardly below a definite limit, as well as for terminating its downward movement when it approaches dangerously close to the side-head $H_s$.

Each of the tool-heads $H_r$, $H_t$ and $H_s$ is provided with a feed knock-out $K_r$, $K_t$ and $K_s$, respectively, comprising adjustable abutment members adapted upon actuation to energize an electrical circuit that controls a fluid-operated thrustor for instantly neutralizing the feed clutches of the respective feed-works $F_r$, $F_t$ and $F_s$.

Referring to Fig. 2, the standard S comprises a substantially hollow vertically-disposed housing 50, provided with bearing supports for the transmission T. Machined ways 51 are located on each inner side wall of the standard S and form bearing surfaces to receive flanged guide bearings 52 located on each side of the housing for the transmission T.

The base B comprises a substantially cylindrical shell 53, integral with the forward end of the standard S. The combined standard and housing 53 are cast integrally and provided with a cored-out portion forming an opening 54 between the standard S and the housing B. The walls formed by the cored-out portion provide bearings 55 on each side of the opening 54 adapted to receive flanged bearing plates 56 on each side of the forward end of the housing for the transmission T. The bearings 55 and 51 support the transmission T. The bearings 51 and 52 extend substantially the full length of the transmission housing absorb all tortional stresses and prevent twisting of the housing when the transmission T is under excessive loads. Additionally, this construction enables bodily axial adjustment of the transmission, facilitating the establishment of radial alignment and a proper driving relation between the transmission T and the table W.

The table W comprises a cylindrical member 57 having radially disposed T slots 58 located on its top surface. The slots 58 are adapted to receive clutch jaws for securing work to the table. The table is provided with a spindle that extends downwardly within the base B and journaled in suitable bearings therein.

Headstock transmission

Referring to Figs. 5 and 6, the transmission T comprises a driving shaft 59 that is driven from the motor M (Fig. 1) through a multiple V pulley 60 (Fig. 6). The pulley 60 is keyed to an extended hub portion of a clutch-driving element 64 that is journaled in the end wall of a housing 62 (Fig. 2) attached to the rear of the standard S. The hub of the element 64 is recessed to provide a bearing for the drive shaft 59. The drive shaft 59 supports a multiple-disc friction clutch 63, the discs of which are provided with peripheral teeth. The clutch driving element 64 (Fig. 6) is provided with internal teeth adapted to mesh with the teeth on the periphery of the friction discs of clutch 63. A spur gear 61 is also keyed to the hub of element 64 for a purpose to be described later. A friction brake 65 is likewise supported on the drive shaft 59, and comprises a friction disc 66 having peripheral teeth adapted to mesh with the internal teeth disposed about an opening in a bracket 67, (Figs. 2 and 6) fixed to the end wall of the standard S. Both the clutch 63 and the brake 65 are provided with metal discs splined to the drive shaft 59 on each side of the friction discs. A sleeve 68 surrounds the shaft 59 between the clutch 63 and the brake 65, and supports a slidable grooved spool 69. Toggle connections 70 and 71 are provided between the spool 69 and certain of the movable metal discs of the clutch 63 and brake 65 whereupon axial movement of spool 69 alternately engages and releases the clutch and brake.

The transmission T is adapted to drive the work-supporting table W at definite speeds throughout a given range. In the present embodiment of the invention wherein the transmission is employed with a vertical turret lathe, it is desirable that the different specific speeds at which the table W is adapted to be driven vary substantially in accordance with a geometrical progression. Furthermore, it is desirable to employ as few gears as possible within the transmission T.

Referring to Fig. 5 the above desired features have been obtained by employing, in the transmission, a primary unit $P_u$, a secondary unit $S_u$ and a tertiary unit $T_u$. These units are designed and constructed so that only parallel shafts are employed throughout the transmission, and certain gears are common to various units. Additionally, the gear combinations of the various units are designed so that the different speeds of the transmission will increase substantially in accordance with a geometrical progression. When it is desired to cover a specific range of speeds, with a given number of changes of speed, it is first necessary to determine the geometrical constant for the desired speed range. This is determined by multiplying the lowest desired speed by the geometrical constant raised to a power equal to the number of desired changes of speed minus 1 and letting that product equal the maximum speed desired from which equation the geometrical constant may be obtained.

The gear combinations of the various units are designed so that the ratio of any gear combination in the primary unit $P_u$ divided by the ratio of a gear combination therein which produces the next lower speed in said primary unit is equal to the first power of the geometrical constant; the ratio of any gear combination in the secondary unit $S_u$ divided by the ratio of a gear combination therein which produces the next lower speed in said secondary unit is equal to the fourth power of the geometrical constant; and the ratio of any gear combination in the tertiary unit $T_u$ divided by the ratio of a gear combination therein which produces the next lower speed in said tertiary unit is equal to the eighth power of the geometrical constant.

Four spur gears 72, 73, 74 and 75 are freely journaled on the drive shaft 59, and each gear is provided with positive-action clutch-engaging teeth arranged between gears 72, 73, and 74, 75. Slidable gear-engaging means 76 and 77 are keyed to the driving shaft 59 and are located between respective gear sets 72, 73, and 74, 75. Thus, movement of the engaging means 76, 77 to the left or to the right as viewed in Fig. 5 will respectively connect shaft 59 to either gears 73, 75 or gears 72, 74. A shaft 78 parallel with shaft 59 is provided in the transmission and is adapted to support four gears 79, 80, 81 and 82 arranged in units of two. These last-mentioned gears are keyed to the shaft 78 and each is retained in constant mesh with gears 72, 73, 74 and 75 respectively. The gears 72, 73, 74 and 75, and 79, 80, 81 and 82 comprise the primary unit $P_u$ of the transmission T.

An additional parallel shaft 83 is provided in the transmission T on which gears 84 and 85 are freely journaled. The gears 84 and 85 are likewise provided with positive-action clutch-engaging teeth on adjacent sides. A positive-action gear-engaging means 86 is keyed to the shaft 83 and is provided with a slidable element for selectively engaging the gears 84 and 85. The gear 84 on shaft 83 is adapted to be maintained in constant mesh with the gear 80 on shaft 78, while the gear 85 on shaft 83 is adapted to be maintained in constant mesh with an additional gear 87 integral with shaft 78. Gears 84, 80, 85, and 87 comprise the secondary unit $S_u$. The shaft 78 acts as a common shaft between the primary and secondary units, and gear 80 serves a dual function in meshing with gear 73 of the primary unit and gear 84 of the secondary unit. By selectively shifting the means 76 and 77, shaft 78 can be driven at four separate and distinct speeds from the drive shaft 59. Furthermore, the shaft 83 may be driven at eight separate and distinct speeds from the drive shaft 59 by selectively shifting the means 76, 77 and 86.

The shaft 83 of the secondary unit is extended and forms one shaft of the tertiary unit $T_u$. The extended portion of shaft 83 is provided with gear teeth 88 adapted to be maintained in constant mesh with a gear 89 freely journaled on a driven shaft 90 forming the other shaft of the tertiary unit $T_u$. Likewise, an extended portion of shaft 83 fixedly supports a gear 91 adapted to be maintained in constant mesh with a gear 92 freely journaled on a sleeve keyed to the driven shaft 90. Each of the gears 89 and 92 are provided with positive-action clutch-engaging means facing each other and disposed between the two gears. A shiftable engaging-means 93, splined to the sleeve on which gear 92 is journaled, is provided between the last two gears for selectively engaging either. In as much as the shaft 83 may be driven at eight different speeds from the driving shaft 59, it follows that selectively shifting the means 93 of the tertiary unit $T_u$ will impart sixteen separate and distinct speeds of rotation to the driven shaft 90.

The driven shaft 90 is arranged co-axially with the shaft 78. This arrangement makes it possible to produce an additional four speeds of rotation of the driven shaft 90 from the driving shaft 59 by employing a single additional gear. Accordingly, the gear 87 fixed to shaft 78 is made longer than would be necessary for its proper meshing with gear 85.

The end of driven shaft 90 adjacent the gear 87 is provided with a spline 94. An internal ring gear 95 is splined on the end of driven shaft 90 and is adapted selectively to be moved axially to directly connect driven shaft 90 with the shaft 78—the internal teeth of ring gear 95 meshing with the extended external teeth of gear 87.

From an inspection of Fig. 5, it is apparent that the driven shaft 90 may be driven at twenty different speeds while employing gears that remain constantly in mesh with their mating gears, thereby avoiding the difficulties encountered, with constructions employing diving keys. Furthermore, the use of the common shaft between the secondary and primary units as well as common gears between units, together with the arrangement of the driven shaft 90 coaxial with shaft 78 of the primary and secondary units, tends to reduce to a minimum the number of gears in the transmission for a given number of different speeds of the driven member. Additionally, each gear combination in the primary, secondary and tertiary units is so designed that it may be used with any other gear combination in any unit and the ability to employ the various gear combinations of each unit over and over, further minimizes the number of gear combinations required for a given number of specific speeds of the driven shaft 90.

The driven shaft 90 is provided with a bevel gear 96 at its end opposite that which contains spline 94. This bevel gear 96 meshes with a bevel ring-gear 97 (Fig. 2) fixed to the under surface of the work-supporting table W.

The various gear combinations of the primary, secondary and tertiary units are selectively engaged and disengaged by the shiftable means 76, 77, 86, 93 and 95. The clutch 63 and the brake 65 are alternately engaged and disengaged by the action of the slidable spool 69. All of these elements are selectively shifted by the movement of a plurality of rods located within a gear-shifting bracket 98 (Fig. 6) and connected to said shiftable elements through linkages to be described.

Referring to Fig. 6, the bracket 98 comprises a relatively flat irregular-shaped box-like element 99 adapted to be bolted to the bottom of the standard S. The walls between the box and the standard are provided with openings through which a series of six reciprocable rods 100, 101, 102, 103, 104 and 105 are adapted to pass.

Referring to Figs. 5 and 6 the rod 100 extends into the standard S to a point on the far side of the transmission T and is connected to a link 106 that is fixed to a vertically-disposed shaft 107. The upper end of the shaft 107 has fixed to it a link 108 which forms a bell-crank with the link 106. Link 108 is connected to a link 109 which in turn is connected to a link 110 fixed to the lower end of a shaft 111. The upper end of shaft 111 fixedly supports a yoke 112 that engages the shiftable element 76 so that reciprocable movement of the rod 100 moves the element 76 to the right and left thereby selectively connecting gears 72 and 73 to the driving shaft 59.

Rod 101 extends into the standard S and is connected to a link 113 which latter is fixed to a vertically-disposed shaft 114 extending upwardly within the standard S to a point adjacent the primary unit Pu. The upper end of the shaft 114 rigidly supports a yoke 115, that engages the shiftable element 77.

The rod 102 is pivoted to a link 116 that is rigidly connected to a vertically-disposed shaft 117. The shaft 117 extends vertically within the standard S to a point near the top of the transmission T. The upper end of shaft 117 fixedly supports a link 118 that is pivoted to a pull rod 119 connected to an arm of an oscillatable yoke 120. The yoke engages the spool 69 on the driving shaft 59 between the clutch 63 and brake 65.

Rod 103 extends into the standard S where it is connected to a link 121 fixed to a pivot shaft 122. The pivot shaft 122 has rigidly fixed thereto a yoke 123 which is adapted to engage the shiftable element 86 of the secondary unit Su.

Rod 104 extends into the standard S to the far side of the transmission T where it is connected to a link 124 rigidly fixed to a pivot shaft 125. The shaft 125 fixedly supports a yoke 126 that engages the shiftable element 95 for directly connecting the driven shaft 90 with the shaft 78.

The rod 105 extends into the standard S and is connected to a link 127 fixed on a pivot shaft 128. The shaft 128 rigidly supports a yoke 129 that engages the shiftable element 93 of the tertiary unit Tu.

From the foregoing it is apparent that selective reciprocation of the rods 100, 101, 103, 104 and 105 will set up various gear combinations in the transmission T to provide twenty different rates at which the driven shaft 90 may be rotated.

Referring to Fig. 6, the rod 100 is connected to a rack 130 within the box 99 by a crank member 131 that is pivoted on a vertically-disposed shaft 132 (Fig. 9). The crank 131 includes a rigid arm 133 that forms a cross-head pivotal-connection with one end of the angularly related rack 130 which insures substantially axial movement of the rod 100 for limited motion of rack 130. The cross-head pivotal connection includes a square slide 134 (Fig. 6) pivoted to the arm 133 of crank 131, and adapted to slide in a transverse slot in the one end of the rack 130. Similarly, rod 101 is connected to a crank 135 which likewise is pivoted on the shaft 132, and a rack 136 is connected to crank 135 in the same manner as rack 130 is connected to the crank 131 (see Fig. 11). Rods 103 and 104 are similarly connected to racks 137 and 138 through cranks 139 and 140, respectively, in the same maner as racks 130 and 136 are connected to cranks 131 and 135.

The rod 102 which actuates the clutch 63 and brake 65 is connected to a bell-crank lever 141 located in the box 99. The lever 141 is pivoted on a vertically-disposed shaft 142, to which is also fixed a relatively long hand-operated lever 143. Referring to Fig. 1, additional main clutch operating levers 143a and 143b are provided, the former for foot actuation and the latter located on the left side of the machine.

The rod 105 which actuates the shiftable element 93 of the tertiary unit Tu is connected to a bell crank lever 144 pivoted within the box 99 on a vertically-disposed shaft 145. The opposite end of the bell crank 144 is connected to a bearing 146 to be described later. The racks 130, 136, 137 and 138 are adapted to be reciprocated along their longitudinal axes, while the bell crank 144 is adapted to be pivoted about the shaft 145 by a movement of bearing 146 in a direction transversely to the movement of said racks 130, 136, 137 and 138.

Referring to Figs. 6 and 8 of the drawings, the racks 130 and 136 are adapted to be reciprocated separately and selectively by a common driver 147, and while either rack 130 or 136 is out of engagement with the driver, it is adapted to be held against movement by an inter-locking mechanism. A shaft 148, extending at right angles to the longitudinal axes of racks 130 and 136, is provided at its one end with a slidable, non-rotatable yoke member 149. The common driver 147 for the racks 130 and 136 is in the form of a mutilated gear keyed to shaft 148 and its teeth mesh with rack teeth formed on the under sides of racks 130 and 136. Each of the legs of the yoke 149 is provided with gear teeth 150 which are adapted to mesh with the rack teeth on the racks 130 and 136. Oscillation of the shaft 148 causes the driver 147 to reciprocate the rack 130 or 136 with which it is in engagement, while at the same time the teeth 150 on the legs of the yoke 149 are adapted to prevent the movement of the rack 130 or 136 which is not in driving engagement with the driver 147. Accordingly, by shifting the shaft 148 axially and then oscillating it, the racks 130 and 136 can be selectively reciprocated to actuate the shiftable elements 76 and 77 of the primary unit $P_u$.

From an inspection of Fig. 5, it is apparent that shiftable elements 86 and 93 must be in engagement with one of the gear combinations of the secondary and tertiary units at the same time in order to impart a drive to the driven shaft 90 through said secondary and tertiary units. Accordingly, the rods 103 and 105 of Fig. 6 must be actuated simultaneously in order to effect driving of the driven member through the secondary and tertiary units. Referring to Fig. 8, a relatively long sleeve 151 extends into the box 99 and telescopes the relatively long shaft 148. The sleeve 151 is provided with two bearing elements, namely, the bearing 146 and another bearing 152, both of which permit axial shifting of said sleeve relatively to shaft 148, as well as oscillating movement of said sleeve. The bearing 146, which is fixed to the bell crank 144 (Fig. 6), is also fixed to the sleeve 151. The bearing element 152 includes a relatively long gear portion 153 adapted to remain in mesh with the rack teeth on the under surface of the rack 137 at all times irrespective of the axial position of the sleeve 151. Accordingly, the sleeve 151 may be moved from its one axial limiting position, wherein the element 93 engages either gear 92 or 89, through a neutral position, to its other axial limiting position wherein the element 93 will engage the other of said gears 92 and 89. During this entire axial movement of sleeve 151, the rack 137 will be in positive mesh with the gear segment 153. This arrangement permits the reciprocation of the rack 137 to cause the element 86 of the secondary to engage either gears 84 or 85 whenever gears 92 or 89 are engaged by the element 93, thus completing a driving train through the secondary and tertiary units to the driven shaft 90.

Reciprocation of the rod 104 within the box 99 (Fig. 6) is adapted to engage and disengage the direct drive between the driven shaft 90 and the shaft 78 which latter is common to the primary and secondary units. This direct drive must not be initiated when a complete drive is established through the secondary and tertiary units. Therefore, it must be a condition precedent to establishing the direct drive that either the element 86 or 93 be in a neutral position. In as much as the bearing 146 that controls the movement of element 93 is moved axially with sleeve 151 between two limiting positions through a medial neutral position, it is apparent that the reciprocation of link 104 should only occur when the bearing 146 is in said neutral position. This has been accomplished by providing a spacing sleeve 154 on the sleeve 151 on which a driving element 155 is journaled. Referring to Figs. 6, 8 and 14, the element 155 comprises a sleeve having a gear portion 156 formed on its periphery. It is also provided with a peripheral slot 157 that cooperates with a pin 158, fixed to the box 99, to permit limited oscillation and to prevent axial movement of the element 155. Driving element 155 is further provided with a pair of diametrically-disposed ears 159 (Fig. 13) which are adapted to engage the side walls of a slot 160 in a connecting element 161 (Fig. 8). The element 161 is fixed to the sleeve 151 and is provided with an undercut recessed portion 162 into which the ears 159 of the driving element 155 are adapted to pass upon axial shifting of the sleeve 151 beyond a predetermined point. The arrangement and construction permits the ears 159 to engage the side walls of the slot 160 in the element 161 only when the bearing 146 is in its neutral position. Axial shifting of bearing 146 to either side of this neutral position will prevent ears 159 from engaging the side walls of slot 160 in the element 161. Therefore, the sleeve 151 may be selectively shifted axially and oscillated to transmit the drive of the primary through the secondary and tertiary units on the one hand, and to transmit said drive directly to the driven shaft 90 as desired.

Referring again to Fig. 8, the sleeve 151 and shaft 148 are adapted to be axially shifted and oscillated by hand levers 163 and 164 respectively. These levers are constructed and arranged to transmit their movement in an amplified form to the shaft 148 and 151, and to prevent the passage of dirt and chips into, or the leakage of lubricant from within the box 99. Referring to Fig. 16, a spherical portion 165 is provided between the ends of hand lever 164 that forms a ball and socket fulcrum with a cover plate 166 for box 99 thereby preventing the loss of lubricant from, or the entrance of dirt and chips into said box. An additional spherical portion 167 is provided at the lower end of the lever 164 that cooperates with a socket 168 keyed to a coaxial extension 169 of shaft 148. The distance between the spherical portions 165 and 167 is greater than that between the portion 167 and the center of extension 169. Accordingly, the degree of movement of the lever 164 that is transmitted to the extension 169 will be amplified so that a substantial angular turning or axial shifting of shaft 148 may be effected with a relatively small movement of lever 164. The one side of socket 168 is provided with an H-shaped groove 170 (Fig. 8) into which the one end of a pin 171 (Fig. 16) is adapted to fit. This construction requires the lever 164 to be returned to a neutral position before the shaft 148 can be axially shifted. The lever 164 is held in either of its positions by the cooperation of a spring-pressed detent 172 and a series of notches 173 on the side of socket portion 168 opposite that which contains the H-shaped groove 110.

The shift lever 163 is mounted within the box 99 and is connected to a coaxial extension 174 of sleeve 151 in substantially the same manner as lever 164 is connected to the extension 169. However, a socket 175 (Fig. 15), similar to socket 168, is keyed to extension 174 and is provided with a recess 176 instead of an H-shaped slot. The H-shaped slot is not necessary to insure lever 163 returning to a neutral position prior to shifting the sleeve 151 axially since the ears 159 of the member 155 (Figs. 8 and 13) must be aligned with the slot 160 in the connecting element 161 prior to such shifting of sleeve 151.

The angular position of the portion of box 99 which houses the extensions 169 and 174 relative to the main portion of the box 99 conveniently locates the gear shifting levers 163 and 164 abreast of the work-supporting table W, but spaced therefrom sufficiently to prevent chips from the working operation interfering with the actuation of said shifting levers.

When a given gear combination within the transmission has been set up by shifting the levers 163 and 164, it is necessary to manually shift the clutch 63 into engagement and to simultaneously release the brake 65. This dual function is accomplished by reciprocation of the rod 102 within the housing 99 (Fig. 6). However, it is desirable to provide an interlock between the main clutch shifting rod 102 and all of the gear-engaging shifting means 76, 77, 86, 93 and 95, so that upon shifting the gear-engaging means, should any gear combination fail to effect complete engagement, the clutch cannot permanently be engaged. It often occurs that the teeth of the engaging means fall tooth on tooth, thus preventing engagement of a selected gear combination. Therefore, it is desirable to provide means for temporarily engaging the clutch 63 to effect relative movement between the teeth of the gear-engaging means should the above condition arise.

The above-referred-to interlocking mechanism comprises a common interference rod 177 (Fig. 6) having an aperture through which a portion of a link 178 is adapted to pass. The link 178 is connected to the bell crank 141 that is manually operated by lever 143 to effect the shifting of the clutch 63 and the brake 65. The link 178 and the aperture in the interference rod 177 must be in alignment before the former will pass through it. Each of the racks 130, 136, 137 and 138 is provided on its one side with notches or cam surfaces 179, equal in number to the positions it will assume during its normal movement while selectively shifting the gear-engaging means. The common interference rod 177 is provided with slots 180 in its top side (Fig. 10) through which the racks 130, 136, 137 and 138 are adapted to pass. Each of the slots 180 in the rod 177 contains one side wall that is formed as an arrowhead or cam 181. A spring 182 bears against the one end of the common interference rod 177, tending to urge it to a position where the arrowheads or cams 181 seat in the bottom of the notches or cam surfaces 179 in the side of the racks 130, 136, 137 and 138. In the event that any of the racks 130, 136, 137 and 138 are not in position for the arrowheads 181 perfectly to seat within the notches 179, the rod 177 will be moved to the right against the action of the spring 182 as viewed in Fig. 6 causing mis-alignment of the aperture within rod 177 and the link 178. Accordingly, under such conditions, the link 178 will abut against the side of the rod 177, thereby preventing actuation of the bell crank 141, and consequently, preventing the engagement of the clutch 63. The end of the rod 177 adjacent the bearing 146 is provided with an arrowhead or cam 183 adapted to cooperate with a notched cam surface formed in an abutment 184 integral with the end of one arm of the bell-crank 144.

The surfaces of the arrowhead or cam 183 and the notched cam surface in abutment 184 are angularly related so that slight movement of the bearing 146 in either direction from its medial or neutral position causes shifting of the interference rod 177 thereby disturbing alignment of the aperture therein with the link 178. The abutment 184 is of such length that it will clear the arrowhead 183 when the bearing 146 is moved sufficiently in either direction to effect complete engagement of the element 93 with either gears 89 or 92. Accordingly, when a complete shift of element 93 is made, rod 177 will be returned by spring 182 to the position where its aperture aligns with the link 178.

Referring to Figs. 6 and 12, the link 178 which serves as the interlock between the gear-combination engaging means and the main clutch 63 is constructed to permit temporary engagement of the main clutch even though the link 178 abuts against the side of the interference rod 177 instead of passing through the aperture therein. Accordingly, the link 178 is in two parts, one portion 185 of which is guided by guides 186 constructed on the base of the box 99. A similar pair of guides 187 is likewise mounted on the base of the box 99 in alignment with the guides 186, and they slidably receive the other portion 188 of link 178. The portion 188 is provided with a finger portion 189 adapted to pass through the aperture in the interference link 177 when the two become aligned. The ends of portions 185 and 188 of link 178 that face each other are bored, counterbored, and tapped to receive a screw 190 and a spring 191. The spring 191 forces the portion 188 away from the portion 185, but permits the portions 188 and 185 to approach each other if the finger 189 abuts the side of the interference rod 177 while continued force is applied to the portion 185. The end of portion 185 opposite that which receives the spring 191 is adapted to be connected to the bell-crank lever 141 by a cross-head connection including a rectangular block 192 slidingly supported in a groove in the end of the portion 185 at right angles to the guides 186. A pin 193 mounted in the rectangular block 192 pivotally engages the lever 141 therewith. Therefore, movement of the hand lever 143 to cause permanent engagement of the main clutch 63 will occur only if the aperture in rod 177 is in alignment with the finger portion 189 of the link 178; otherwise, the finger 189 will abut the side of rod 177 and movement of the lever 143 will cause compression of the spring 191, effecting temporary engagement of the clutch 63. However, should complete engagement of the selected gear combination fail to occur, spring 191 will cause separation of the parts 185 and 188 upon release of the lever 143, thereby causing clutch 63 to become disengaged.

An additional interlock is provided between the shifting rack 138 for establishing the direct drive and the rod 105 of the tertiary unit to prevent either one of said means from being operated if the other is in engagement with its respective gears. Referring to Figs. 6, 13, 14 and 17 the interlock comprises a rod 194 connected to the slidable bearing 146 and guided by a groove 195 in a support 196 integral with the base of box 99 (Fig. 13). The rod 194 is provided with a slot 197 (Figs. 6 and 17) adapted to receive a cross bar 198 of an U-shaped connector plate 199 slidably mounted in a recessed portion of bearing 146. The rod 194 is also provided with a relatively long slot 200 and an additional slot 201 (Fig. 17), the width of which just clears the rack 138. The rack 138 is provided with a slot 202 the width of which just clears the thickness of rod 194, and when aligned with the slot 201 of rod 194 the latter slot clears the depth of rack 138. Accordingly, it will be impossible to shift rack 138 unless the slot 201 in rod 194 and the slot 202 in rack 138 are in alignment. The arrangement and construction is such that these slots will be aligned only when the bearing 146 is in a position where shiftable element 93 is in neutral, and the rack 138 is in a position where shiftable element 95 is in neutral, whereupon either rack 138 or bearing 146 may be moved, and shifting of either cause locking of the other in neutral position.

*Cross-rail*

Referring to Figs. 1, 2 and 4, standard S is provided with spaced vertical bearing surfaces 203 and 204 along which the cross-rail C is adapted to slide. It comprises a substantially rectangular casting 205 having machined ways on its back for engagement with surfaces 203, 204 and horizontal bearing surfaces on its front side including flanges 206 at the top and bottom thereof along which the turret head Ht and ram head Hr are adapted to slide. The cross-rail C is suitably gibbed to the bearing surfaces 203, 204 and is provided with threaded means for cooperation with vertically-disposed, axially-fixed rotatable screws 207 and 208 located on each side of the standard S. The screws 207 and 208 are adapted to be simultaneously rotated in either direction by the headstock transmission T through a system to be described later.

*Turret head*

Referring to Figs. 1, 2, 3 and 18, the turret or main head Ht comprises a multi-tool supporting turret 209 rotatably mounted on a pin fixed to the lower end of a slide 210. The turret 209 is shown, described and claimed in application Serial No. 308,808 filed December 12, 1939 in the name of Edward P. Bullard, et al. The slide member 210 is constructed with longitudinal bearing grooves 211 (Fig. 18) which cooperate with mating guide bearings 212 on a swivel 213 which latter is provided with a connector adapted to ride in an arcuate groove 214 (Fig. 3) located in the front face of a saddle 215. The saddle 215 is provided with an arcuate rack 216 that cooperates with a worm on a shaft 217 journaled in the swivel 213. The saddle is supported on the upper and lower flange bearings 206 of the cross-rail C.

Referring to Figs. 1 and 3, the head Ht is moved horizontally along the flange bearings 206 by a horizontally disposed screw 218 that is threaded into a boss 219 on the rear of the saddle 215.

Referring to Figs. 3 and 18, and particularly Fig. 18, reciprocation of the turret head Ht along bearings 212 of the swivel 213 is effected by a splined shaft 220 (Figs. 1, 3 and 18) parallel with screw 218 that slidingly supports a sleeve 221 within a cored-out opening 222 in the rear of the saddle 215. The sleeve 221 that is splined to shaft 220 is fixed against axial movement relative to the saddle 215 by oppositely disposed collars 223. The collars 223 are accurately fixed to the saddle 215 by pins 224 and these collars rigidly fix the location of the splined sleeve 221 through the end thrust bearing 225. A bevel pinion 226 is keyed to the sleeve 221 and its one end abuts against the collar 223 opposite that against which the bearing 225 abuts. The bevel gear 226 meshes with a bevel gear 227 journaled in the saddle 215, which gear is hollow and supports, in splined relation, a studded bevel gear 228. The gear 228 meshes with an additional bevel gear 229 Fig. 3 fixed to a vertically-disposed screw 230. The upper end of the screw 230 is threaded into a boss 231 (Fig. 2) fixed to the top of the slide member 210, and the lower end of said screw is journaled in a bearing near the bottom of the swivel 213 and held therein against axial movement. From the foregoing, it is apparent that rotation of the screw 218 and the splined shaft 220 will effect movement of the head Ht horizontally along the cross-rail C and along the bearings 212 of swivel 213, respectively. Rotation of screw 218 and splined shaft 220 is effected through the feed-works transmission Ft (Fig. 1) to be described later.

*Ram head*

Referring to Figs. 1 and 18, and particularly Fig. 18, the ram head Hr comprises a single tool support 232 that is formed in a hollow slide 233 by a slot 234 across which clamping screws 235 extend. The slide 233 is provided with flanges 236 that engage bearing grooves 237 formed in the forward portion of a swivel 238. The swivel 238 is clamped to a saddle 239 by clamping screws 240 (Fig. 1). The saddle 239 is substantially the same as the saddle 215. Additionally, the swivel 238 is provided with a connector that rides in an arcuate groove 241 in saddle 239, and oscillatable movement of the swivel 238 is effected in the same manner as that of swivel 213.

Horizontal movement of the saddle 239 is effected by a horizontally disposed screw 242 (Fig. 1) that is in axial alignment with, but disconnected from screw 218. The screw 242 is in threading engagement with a boss on the back of saddle 239 substantially the same as screw 218 engages boss 219 (Fig. 3).

Movement of slide 233 along the bearings 237 in swivel 238 is effected by a horizontally disposed splined shaft 244, aligned with, but disconnected from splined shaft 220.

A pair of oppositely disposed collars 246 are held within a cored-out hole 247 in the saddle 239 in the same manner that collars 223 are held within the hole 222 of saddle 215. Likewise, a sleeve 248 is rigidly positioned between the collars 246 and it is splined to shaft 244. A bevel gear 249 is keyed to sleeve 248 and it meshes with a bevel gear 250 splined to the stud of a pinion 251 which latter is journaled between the saddle 239 and swivel 238 at the center of curvature of arcuate groove 241. The pinion 251 meshes with a gear 252 splined to the stud of a bevel gear 253 that meshes with a similar bevel gear 254 fixed on a screw 255 (Figs. 1 and 18). The top portion of screw 255 is threaded into a boss fixed to the top of slide 233 in the same manner as the screw 230 is engaged with the boss 231 that is connected to the slide 210 (Fig. 2). The provision of the gear train 251, 252 enables locating the slide 233 closer to the inside surface 256 of the swivel 238 than can be accomplished when a turret head such as Ht is employed. Consequently, a tool held by the support 232 can approach the work, and/or the head Ht closer for certain types of work. From the foregoing, it is evident that rotation of the screw 242 and the splined shaft 244 will cause horizontal movement of the head Hr and movement of said head along the bearing grooves 237 respectively. Rotation of the screw 242 and splined shaft 244 is effected through the feed-works transmission Fr (Fig. 1) to be described later.

*Side head*

Referring to Figs. 1, 2, 4 and 4a, the vertical slide bearing 204 on the right hand side of standard S (Fig. 4) extends downwardly to a point 257 near the bottom of the machine. The side head Hs comprises a table 258 (Fig. 4a) that is gibbed to the bearing surface 204 at the front of standard S and extends toward the rear thereof where it is provided with a tongue 259 that slides along a rear, vertically-disposed bearing 260.

A tool-holding turret 261 is journaled on a stud on the one end of a slide 262 that is adapted to be reciprocated horizontally within bearings 263 formed in the front portion of the table 258.

A gear bracket 264 is attached to the under surface of the table 258. The bracket 264 supports a shaft 265 having a worm 266 thereon that meshes with a worm gear 267 keyed to a shaft 268 journaled within the bracket 264. An additional gear 269 is keyed to shaft 268 that meshes with a spur gear 270 which latter meshes with a rack 271 formed on the lower surface of the slide 262. Accordingly, rotation of the shaft 265 causes horizontal reciprocation of slide 262 and tool holder 261.

Another shaft 272 is journaled in bracket 264, and it supports a worm 273 that meshes with a worm gear 274 keyed to a shaft 275 (Fig. 4A), likewise journaled in bracket 264. A spur gear 276 is keyed to the opposite end of shaft 275, and it meshes with a vertically disposed rack 277 integral with the side of standard S. Accordingly, rotation of shaft 272 will effect vertical movement of the side head Hs vertically along the side of the standard S. Rotation of the shafts 265 and 272 is effected through the feed works transmission Fs that is mounted on the side head Hs adjacent the bracket 264.

*Drive for cross-rail and feed-works*

The feed-works transmission Fr, Ft and Fs are adapted to be supplied with power from the headstock transmission T. Since each head Hr, Ht and Hs is adapted to be moved at a relatively rapid, substantially constant traverse speed, and at a plurality of relatively slow speeds that are directly related to the speed of rotation of the table W, two separate sources of power for each feed-works must be provided by the transmission T.

Referring to Figs. 2 and 6, the spur gear 61, to which the pulley 60 is attached, is driven at a substantially constant, relatively rapid speed since it is located at the power input side of the transmission T. The gear 61 meshes with a gear 278 (Fig. 2) keyed to a shaft 279 that extends over the top of the transmission T to a point near the center thereof where it is journaled in a bearing bracket 280. A bevel gear 281 is keyed to the end of shaft 279 within bracket 280 and it meshes with a bevel gear 282 fixed to the lower end of a vertically-disposed shaft 283.

A spur gear 284, keyed to the driven shaft 90 of the transmission T, meshes with a gear 285 fixed to one end of a stub shaft 286. A bevel gear 287 is fixed to the other end of shaft 286 and meshes with a bevel gear 288 keyed to the lower end of a vertically-disposed shaft 289. Since the gear 284 rotates with the table W and its speed is in direct proportion with that of the table, the rotative power of shaft 289, driven by gear 284, is employed as the feed driving shaft.

The shafts 283 and 289 are located substantially in the center of the standard S and extend upwardly therethrough into the gear bracket G located outside and on the top of standard S.

Referring to Fig. 19, the upper ends of shafts 283 and 289 support bevel gears 290, 291, respectively, that mesh with bevel gears 292, 293 that are keyed to a pair of parallel shafts 294, 295 that extend outwardly from each side of the gear box G to points beyond the sides of standard S. Bevel gears 296, 297 are keyed to the outer ends of shafts 294, 295 and they mesh with bevel gears 298, 299 fixed to the upper ends of vertically-disposed splined shafts 300, 301. Only the right hand set of splined vertical shafts 300, 301 and their driving means are shown in Fig. 19. The shafts 294, 295 extend out of the left hand side of bracket G (Fig. 19) and likewise support a pair of bevel gears that mesh with bevel gears fixed to the top of vertically disposed, splined shafts 302, 303 (Fig. 1).

The arrangement and construction of the apparatus is such that the feed-works Ft and Fs travel along a single vertical path and, therefore, the vertical splined shafts 300, 301 are employed for transmitting the power from transmission T to both feed-works Ft and Fs. Accordingly, the shafts 300, 301 extend throughout substantially the entire height of the standard S. On the other side, shafts 302, 303 need only extend part way along this side since only one feed-works Fr is to be supplied with power.

Not only does the shaft 283 supply power to the feed-works through the gear bracket G, but it also supplies power for rotating the screws 207, 208 (Figs. 1 and 2) that drive the cross-rail C. Referring again to Fig. 19, the bevel gear 292 that is driven by the rapid traverse shaft 283 has formed thereon a spur gear 304 that meshes with a spur gear 305 journaled on the hub of bevel gear 293. The spur gear 305 meshes with a relatively wide gear 306 fixed to a shaft 307. One portion of wide gear 306 meshes with a spur gear 308 journaled on a driving shaft 309. Another portion of wide gear 306 meshes with a gear 310 laterally spaced from and located behind gear 308. The gear 310 is formed on one end of a sleeve 311 journaled on a shaft 312. The other end of sleeve 311 integrally supports a gear 313 that meshes with a gear 314 also journaled on shaft 309. A conventional clutch 315 is splined on shaft 309 between gears 308 and 314 and is adapted to cooperate with clutch engaging faces formed on the adjacent faces of gears 308 and 314. The gear train just described effects opposite rotations of gears 308 and 314 so that upon selective shifting of clutch 315, shaft 309 may be caused to rotate in either direction.

The shaft 309 extends outwardly from each side of the gear bracket G (only the right hand side is shown in Fig. 19) and the outer ends thereof are provided with worms 316 that mesh with worm gears 317 keyed to the vertically disposed screws 207 and 208.

A clutch shifting lever 318 is pivoted intermediate its ends and is connected to a shaft 319 having rack teeth 320 on each end that mesh with spur gears 321 keyed to vertical shafts 322 parallel with and adjacent the screws 207 and 208. A hand lever 323 is connected to one of the shafts 322 for manually shifting clutch 315 to cause raising and lowering of the cross-rail C. The handle 323 is shown on the shaft 322 at the right of the machine in Fig. 19, and on the shaft 322 at the left of the machine in Fig. 1.

*Feed-works transmission*

Referring to Figs. 1, 2 and 4, the pairs of tool-head operating shafts 218, 220; 242, 244; and 265, 272 are equally spaced and aligned so that the transmissions Fr, Fs and Ft are interchangeable, although a left hand bracket is required for the transmission Fr. Since all of the feed-works are identical in construction and operation, only the feed-works Ft will be described in detail.

The feed-works Ft comprises a substantially rectangular box-like housing 324 adapted to be hermetically sealed and to contain sufficient lubricant to keep the transmission gears submerged in oil, thereby insuring adequate lubrication, noiseless operation and preventing dust and dirt from entering the transmission. The housing 324 is provided with substantially cylindrical bosses 325 and 326 through which the vertically-disposed shafts 300 and 301 are adapted to pass.

Referring to Fig. 23, a bevel gear 327 is journaled in the cylindrical boss 326 and splined to the shaft 301. The bevel gear 327 meshes with a bevel gear 328 keyed to a shaft 329. A portion 330 of the shaft 329 is splined to receive slidable gear units 331 and 332. The gear units 331 and 332 are adapted to be selectively meshed with three gear units 333, 334 and 335 keyed to a shaft 336 parallel with shaft 329. The single gear of unit 333 is adapted to mesh with one gear of unit 331; and the gear unit 334 is provided with two gears one of which is adapted to be meshed with a gear of the sliding unit 331 and the other with a gear of the sliding unit 332. The gear unit 335 is provided with a gear adapted to be meshed with one of the gears of the slidable unit 332. From an inspection of Fig. 23, it is apparent that selective shifting of the slidable gear units 331 and 332 will provide four separate and distinct rotative speeds of shaft 336 from a single speed of shaft 329.

The rotative speeds provided by the transmission T for the feed-works require substantial reduction before they can be employed for feeding the turret head Ht during a working operation. Accordingly, a speed-reduction unit is contained within the transmission of the feed-works Ft. The construction and arrangement is such that the speed of shaft 336 is reduced through a plurality of successive steps, at each of which a different driving rate for the feed-works Ft is produced. The shafts 329 and 336 of Fig. 23 are extended to support the speed-reduction unit of the transmission. The gear unit 335 on the shaft 336 includes a relatively small gear 337 in constant mesh with a relatively large gear 338 freely journaled on the extension of shaft 329. Another relatively small gear 339, integral with gear 338, is constantly in mesh with a relatively large gear 340 freely journaled on the extension of shaft 336. A third relatively small gear 341, integral with gear 340, is also constantly in mesh with a relatively large gear 342 freely journaled on the shaft 329. The arrangement of gears 337, 338, 339, 340, 341 and 342 may be continued indefinitely to provide any desirable number of successive steps of speed reduction. In the present instance, three steps are provided, each of which bears a definite relation to the preceding and the following. A driven shaft 343 is located within the transmission Ft in parallel relation to the shafts 329 and 336. Shaft 343 is actually in front of shaft 336, but for clarity, Fig. 23 discloses shaft 343 above shaft 336. A pair of gears 344 and 345 are splined to the shaft 343. Movement of the gear 344 to the right as viewed in Fig. 23 will provide four separate and distinct speeds of shaft 343 upon selectively shifting the gear units 331 and 332. Movement of gear unit 344 to the left will produce an additional four speeds of shaft 343 which speeds are reduced by the gear ratio of gears 337, 338, 339 and 340, constituting the first step of the speed-reduction unit. Shifting gear 345 to the right will produce an additional four speeds upon selectively shifting gears 331 and 332. These speeds will be further reduced corresponding to the second speed-reduction step of the unit; and shifting gear 345 to the left will produce a final four speeds of shaft at the lowest rate the speed-reduction unit can accomplish. Accordingly, shaft 343 is adapted to be driven at sixteen separate and distinct speeds by selectively shifting the gears 331, 332, 344 and 345.

The sixteen speeds of the shaft 343 derived from shaft 301, as well as the substantially constant speed of the shaft 300, are adapted to be transmitted to the screw 218 and splined shaft 220 for controlling the movement of the turret head Ht along its intersecting paths. Furthermore, screw 218 and shaft 220 are adapted to be driven in both directions at the plurality of speeds of shaft 343 and the substantially constant speed of shaft 300. In the present invention this has been accomplished by providing a unique transmission including separate driving shafts for the screw 218 and shaft 220 and a pair of auxiliary shafts, all of which support the power transmitting and the reversing mechanism.

Referring to Figs. 22 and 24, and particularly to Fig. 24, the driven shaft 343 is provided with a gear 346 keyed thereto and adapted to constantly mesh with a gear 347 journaled on an auxiliary shaft 348. The gear 347 is adapted to drive a relatively long gear 349 likewise journaled on the shaft 348. An over-load clutch 350 is provided between the gears 347 and 349, urged into engagement by a spring 351 surrounding shaft 348. The relatively long pinion 349 is adapted to partially overlie and mesh with a similar relatively long pinion 352 freely journaled on another auxiliary shaft 353. The auxiliary shafts 348 and 353 are located in a substantially horizontal plane. A pair of driving shafts 354 and 355 are arranged in a substantially vertical plane that intersects the horizontal plane midway between the shafts 348 and 353. The shafts 354 and 355 are provided with a pair of driving gears 356 and 357 that are constantly in mesh with the relatively long pinion 349 on the auxiliary shaft 348; and a pair of driving gears 358 and 359 in constant mesh with the relatively long pinion 352 on the auxiliary shaft 353. Gears 356 and 357 are adapted to be rotated in opposite directions from that of gears 358 and 359, and by selectively engaging gears 356, 357, 358 and 359 to the driving shafts 354 and 355, it is apparent that said driving shafts may be driven at sixteen different speeds in either direction upon selectively shifting the gears 331, 332, 344 and 345 of the variable speed unit. Inasmuch as it is desirable to maintain a definite relation between the rotation of table W and the movement of the turret head Ht, it is necessary to provide positive-action clutch-engaging means for connecting the various gears 356, 357, 358 and 359 to the driving shafts 354 and 355. Accordingly, positive-action axially-shiftable clutch members 360 and 361 are splined to the driving shafts 354 and 355, respectively. The slidable, positive-action clutch-engaging means are adapted to cooperate with mating clutch elements 362, 363, 364 and 365 on the gears 356, 358, 357 and 359, respectively. The driving shafts 355 and 354 are adapted to drive the screw 218 and the splined shaft 220, respectively, for controlling the movement of the turret head Ht. Accordingly, intermeshing bevel gears 366 and 367 are fixed to the driving shaft 355 and driving shaft 354, respectively, and intermeshing bevel gears 368 and 369 are adapted to be keyed to the screw 218 and the splined shaft 220, respectively.

The driving shafts 354 and 355 are adapted to be rotated in opposite directions at a substantially constant relatively rapid traverse speed to move the turret head Ht toward and away from the work preparatory to and after a metal-working operation. Accordingly, a bevel gear 370 journaled in the substantially cylindrical boss 325 of the housing 324 (not shown in Fig. 24) is splined to shaft 300. Gear 370 is adapted to mesh with a bevel gear 371 integral with a stub shaft 372 that is coaxial with the auxiliary shaft 348. A relatively long pinion 373 is adapted to be keyed to the stub shaft 372. A relatively long sleeve gear 374, provided with gear portions 375 and 376, is adapted to be journaled on the auxiliary shaft 353—the gear portion 375 meshing with the relatively long pinion 373. Accordingly, pinion 373 and gear 376 are rotated in opposite directions. A pair of gears 377 and 378 journaled on the driving shafts 354 and 355, respectively, are maintained in constant mesh with the pinion 373; and a similar pair of gears 379 and 380 journaled on the driving shafts 354 and 355, respectively, are adapted to be maintained in constant mesh with the gear portion 376 of the sleeve gear 374. Inasmuch as the substantially constant, rapid-traverse speed at which the screw 218 and shaft 220 are driven need not bear a definite relation with respect to the speed at which the table W is rotated by the transmission, it is unnecessary to provide positive-action clutches between the gears 377, 379 and 378, 380. Accordingly, axially-shiftable friction cone clutch members 381 and 382 are splined to the driving shafts 354 and 355, respectively, between the gears 377, 379 and 378, 380. The friction clutch members 381 and 382 are adapted to engage corresponding, or mating friction clutch members on adjacent sides of gears 377, 379 and 378, 380, respectively. Accordingly, by selectively shifting the clutch members 381 and 382, it is possible to drive the screw 218 and splined shaft 220 in either direction at a substantially constant, relatively rapid traverse speed.

The mechanism for selectively shifting the clutch elements 360 and 381 is identical with that for shifting elements 361 and 382, and for that reason, only the shifting mechanism for the clutch elements 360 and 381 will be described. Referring to Figs. 22 and 25, of the drawings, shiftable elements 360 and 381 are provided with yoke elements 383 and 384, respectively. The yoke 383 is oscillatably mounted on a shaft 385 within the housing 324. In a similar manner, the yoke 384 is oscillatably mounted upon a shaft 386. The yoke elements 383 and 384 are actuated by a pair of axially-aligned individually-oscillatable sleeves 387 and 388 journaled within bearings mounted in the housing 324. Each of the sleeves 387 and 388 is provided with a peripheral cam slot 389 and 390, respectively. The yoke elements 383 and 384 support arms 391 and 392, respectively, that extend over the grooves 389 and 390 and provide supports for rollers 393 and 394 adapted to fit in the grooves 389 and 390, respectively. Selective oscillatable movement of the sleeves 387 and 388 will cause the yokes 383 and 384 to shift the clutch elements 360 and 381 into engagement with their corresponding mating elements 356, 358 and the cone clutch surfaces of the adjacent sides of gears 377, 379, respectively.

Selective actuation of the sleeves 387, 388 is effected by the action of an axially-movable, oscillatable shaft 395 that extends through the aligned sleeves 387 and 388. The shaft 395 extends outside of the housing 324 and is provided with a hand lever 396. The shaft 395 is provided with pins 397 and 398 adapted to seat within notches 399 and 400 located in the non-adjacent ends of the aligned sleeves 387 and 388, respectively. Axial movement of the shaft 395 to the right, as viewed in Fig. 25, will cause the pin 397 to seat within the slot 399 of sleeve 387 so that oscillation of the shaft 395 causes yoke 383 to move the clutch element 360 into and out of engagement with the gears 356 and 358. Axial movement of the shaft 395 to the left, as viewed in Fig. 25, will cause pin 398 to seat within slot 400 of sleeve 388, whereupon oscillating shaft 395 will cause the yoke 384 to shift the element 381 into clutching engagement with either gears 377 and 379.

One of the clutch-shifting elements 360, 381 must be in neutral position when the other is in engagement with its respective gears; otherwise, it would be possible to jam the machine. An interlock is therefore provided to prevent the axial shifting of shaft 395 except when it is in position insuring the neutrality of the elements 360 and 381. Referring to Figs. 25 and 26, the interlock comprises a cup-shaped member 401 securely held within a wall of the housing 324. The cup-shaped member 401 is provided with a central opening 402 through which one end of the shaft 395 is adapted to pass. It is further provided with diametrically-disposed slots 403 on each side of the opening 402 (Fig. 26) through which the pin 398 is adapted to pass. These diametrically-disposed slots 403 are arranged so that the shaft 395 must be in a position insuring the neutrality of the clutch-engaging elements 360 and 381 before it can be axially moved in either direction to establish a connection between it and either of the sleeves 387 or 388.

Referring to Fig. 22, a spring-pressed detent 404 is adapted to cooperate with a recess 405 to maintain the sleeve 387 in neutral position. Recesses 406 and 407 are provided on opposite sides of the recess 405 for receiving the detent 404, thereby to hold the sleeve 387 in either of its oscillated positions on each side of its neutral position. Inasmuch as the positive-action clutch-engaging means 360 is adapted to cooperate with the teeth on the gears 356, and 358, it is quite possible that the teeth may fall tooth on tooth and not properly mesh at the instant the shaft 395 is oscillated to effect engagement of the positive-action clutch 360. The recesses 406 and 407 are therefore provided with wide entrant portions, the rims of which come very close to the recess 405. The walls of the recesses 406 and 407 slope inwardly to a relatively narrow bottom portion. Because of this construction, slight oscillatable movement of shaft 395 will move sleeve 387 sufficiently for detent 404 to engage the wide entrant portions of recesses 406 and 407. Thus, upon continued rotation of gears 356, 358, the spring-pressed detent 404 will automatically effect engagement of the positive-action clutch 360 even though the teeth fall tooth on tooth and the operator releases his hold on the lever 396.

The driving shaft 354 is adapted to be manually rotated to effect adjustment of the turret head Ht independently of the feed-works Ft. Referring again to Fig. 25, a bearing 408 is mounted in the side wall of the housing 324 adapted to support a sleeve 409 through which the shaft 395 is adapted to extend to the outside of the housing 324. The sleeve 409 is provided with a member having teeth 410 adapted to mesh with teeth 411 on the end of a hub 412 of a hand wheel 413. Hand wheel 413 is adapted to be axially moved along the sleeve 409 to engage and disengage the teeth 410 and 411. The inner end of the sleeve 409 rigidly supports a pinion 414 that meshes with a pinion 415 keyed to the driving shaft 354. Accordingly, shifting the hand wheel 413 to the right, as viewed in Fig. 25, and rotating the same will cause rotation of driving shaft 354, and consequently, the rotation of splined shaft 220.

The size of the hand wheel 413 is sufficient to constitute a hazard to the operator as well as to produce a substantial fly-wheel effect if it is rotated at a rapid rate. The fly-wheel effect would have sufficient momentum to cause over-travel of the head Ht when the latter is disengaged from the feed-works Ft. Gears 356 and 358 rotate shaft 354 and hand wheel 413 at a relatively slow rate while gears 377 and 379 rotate shaft 354 and hand wheel 413 at a rapid rate. The present invention contemplates means for insuring the separation of the teeth 410 and 411 when the clutch element 381 is shifted into operative position to drive shaft 354 by gears 377 and 379. The means includes an abutment 416 on the outer end of shaft 395 adapted to cooperate with the hand wheel 413 so that axial movement of the shaft 395 to the left, as viewed in Fig. 25, will automatically disengage the teeth 410 and 411. An identical clutch-shifting mechanism is provided for the elements 361 and 382 on driving shaft 355, located within the housing 324 below the clutch shifting mechanism described.

Referring to Fig. 4, the hand wheels 413 and the clutch shifting levers 396 are absolutely directional. That is to say, the movement of the clutch-shifting lever 396 for shaft 220 downwardly, as viewed in Fig. 4, will cause the turret head Ht to move downwardly, and movement of said clutch lever 396 upwardly will cause a corresponding movement of the turret head Ht. Likewise, counter-clockwise rotation of the hand wheel 413 for shaft 220 will effect a downward movement of the turret head Ht and clock-wise movement of said hand wheel 413 will effect an upward movement of said turret head. Additionally, movement of the lever 396 for screw 218 downwardly will cause the turret head Ht to move inwardly, and movement of said lever upwardly will cause movement of said turret head outwardly. Counter-clockwise rotation of the hand wheel 413 for screw 218 will cause turret head Ht to move inwardly, and clockwise rotation of said hand wheel will cause said head to move outwardly.

Referring to Figs. 20, 21, 22 and 23, the slidable gears 331, 332, 344 and 345 of the variable-speed unit (Fig. 23) of the feed-works Ft are adapted to be shifted by parallel rods 417, 418, 419, and 420 (Figs. 20, 21 and 22). Rod 417 supports a shifting element 421 adapted to engage gear 332; the rod 418 supports a shifting element 422 adapted to engage gear 331; the rod 419 supports a shifting element 423 adapted to engage gear 344; and the rod 420 supports a shifting element 424 adapted to engage the gear 345. The rods 417, 418, 419 and 420 are adapted to be selectively actuated by means of oscillatable and axially-shiftable shafts 425 and 426. The shafts 425 and 426 extend from within the housing 324 to the outside thereof and support handles 427, 428 at the outer ends thereof (Fig. 21). The rods 417 and 420 are provided with rack teeth 429 and 430 facing in opposite directions. The rods 418 and 419 are provided at their one ends with rack elements 431 and 432. The rack elements 431 and 432 include rack teeth which are located in the same planes as the rack teeth 429, and 430, respectively. The shaft 425 is provided with a pinion 433 adapted to mesh with the rack teeth on the rod 417 and those on the rack member 431. The shaft 426 supports a pinion 434 adapted to mesh with the rack teeth on shaft 420 and those on the rack member 432. It is desirable to lock those rods 417, 418, 419 or 420 that are not in mesh with the driving pinions 433 or 434. Accordingly, a slidable yoke member 435 is mounted upon a pin 436 fixed in the housing 324. The legs of the yoke member 435 straddle the pinion 433, and the outer ends of the legs of said yoke are provided with gear teeth adapted to mesh with the rack teeth 429 and those on the rack element 431. Additionally, a yoke member 437 is mounted on a pin 438 for slidable movement. Legs of yoke 437 are likewise provided with rack teeth adapted to mesh with rack teeth 430 and those on the rack element 432. In the position shown in Fig. 21, the pinions 433 and 434 are in mesh with the rack teeth 429 and 430, while the one leg of each yoke member 435 and 437 is in mesh with the rack teeth on the elements 431 and 432, thereby preventing the movement of the rods 418 and 419. Oscillatable movement of the shafts 425 and 426 will effect shifting of rods 417 and 420 to move gears 332 and 345. Axial movement of the shafts 425 and 426 to the right, as viewed in Fig. 21, will cause the meshing of pinions 433 and 434 with the rack teeth on rack elements 431 and 432, while at the same time causing the rack teeth of one of the legs of yoke members 435 and 437 to move into mesh with the rack teeth 429 and 430. Under such circumstances, the rods 417 and 420 are locked in adjusted position, and upon oscillatable movement of the shafts 425 and 426, rods 418 and 419 will be axially moved thereby shifting gears 331 and 344.

Referring to Fig. 21, an indicator 439 is adapted to cooperate with the shafts 425 and 426. It comprises a pair of H-shaped members 440 and 441, the legs of which partially surround the shafts 425 and 426. Pins 442 and 443 in shafts 425 and 426, respectively, are adapted to cooperate with the H-shaped slots to indicate the speed ratio set up in the variable speed unit of the feed works Ft, and to prevent the axial shifting of shafts 425 and 426 except when the gears 331, 332, 344 and 345 are in a neutral position. A spring-pressed detent is provided for each shaft 425 and 426 that cooperates with notches in said shafts for releasably maintaining the gears 331, 332, 344 and 345 in complete meshing engagement. Each corner of the H-shaped slot 441 is provided with an index while a column of indices representing feeds per inch as well as a column of the indices of H-shaped slot 441 are located adjacent the legs of the H-shaped slot 440. Accordingly, by consulting the index plate and by selectively operating the shafts 425 and 426, any one of the sixteen different speeds of the transmission $F_t$ may be provided. For example, any of the speeds may be provided by placing the pin 442 in the leg of slot 440 that is in line with the column containing the desired feed, and placing the pin 443 in the leg of slot 441, the letter of which corresponds with the letter in line with the desired feed adjacent slot 440.

Feed knock-out mechanism

The tool-supporting heads $H_r$, $H_t$ and $H_s$ are provided with feed knock-out mechanisms $K_r$, $K_t$ and $K_s$, respectively, adapted to accurately limit the travel of said tool heads along either of their paths of movement by neutralizing the clutches of the respective feed-works $F_r$, $F_t$ and $F_s$. Since the feed-works $F_t$ has been specifically described, the feed knock-out $K_t$ will be described in detail.

Referring to Fig. 21, the feed knock-out mechanism $K_t$ includes collars 444 and 445 clamped to shafts 395 and 395¹, respectively. The collar 444 is provided with two ears 446 that are disposed on opposite sides of, and have surfaces that lie in a plane that intersects shaft 395. Collar 445 is identical with collar 444 and it is pinned on shaft 395¹ in the same manner as collar 444 is pinned on shaft 395. The ears 446 on both collars 444 and 445 are adapted to lie in substantially horizontal planes when the shafts 395, 395¹ and their corresponding clutch elements are in neutral. Oscillating shafts 395 and 395¹ to shift their corresponding clutches into driving position, causes the planes that contain ears 446 to become angularly disposed with respect to the horizontal as illustrated by the dotted lines in Fig. 21. A vertically-disposed shaft 447 adjacent the shafts 395 and 395¹ is provided with a relatively long vertically-reciprocable sleeve 448. The sleeve 448 rigidly supports yoke elements 449 and 450 that overlie the ears 446 of collars 444 and 445 on shafts 395 and 395¹. Normally, the sleeve 448 is urged upwardly out of active position by a spring 451. Movement of the sleeve 448 downwardly causes the legs of yokes 449 and 450 to engage the ears 446 forcing the collars 444 and 445 into a position where the ears lie in substantially horizontal planes, thereby insuring that the clutches controlled by the shafts 395 and 395¹ are in their neutral positions.

Referring to Figs. 21 and 25, vertically-downward movement of the sleeve 448 is effected by the actuation of a fluid-operated electrically-controlled thrustor 452. The thrustor 452 is located on the back of the feed-works $F_t$ and is of conventional design, comprising a cylinder in which a vertically-reciprocable plunger is adapted to operate. The plunger is provided with a rod 453 pivotally connected to a link 454 that extends forwardly to near the front of the feed-works $F_t$. The link 454 is rigidly connected to the shaft 385 that extends transversely through the feed-works $F_t$ and on which the yoke element 383 is journaled. A pusher link 456 is rigidly connected to the shaft 385 and includes an abutment portion 457 that overlies a portion of one of the yokes 449 or 450 (Fig. 21). Accordingly, energization of the circuit of a motor that operates the thrustor 452 causes an upward movement of the rod 453 and link 454, thereby turning shaft 385 so that link 456 is forced downwardly into engagement with one of the yokes 449 or 450 and causing their downward movement which will oscillate either of shafts 395 and 395¹ into their neutral positions if they are not already in such position. Accordingly, such action will disengage the feed-works $F_t$ from the screw 218 and shaft 220 thereby stopping the head $H_t$ at points along its respective paths of travel.

Referring to Figs. 4, 18 and 28, energization of the circuit of the motor for the thrustor 452 is effected by a relatively slight rectilinear movement of a plate 458 mounted for reciprocation in slide bearings 459 (Fig. 18) on the swivel 213. This relatively slight rectilinear movement of the plate 458 is adapted to actuate an arm 460 (Fig. 4) of an electric contact switch 461 likewise mounted on the swivel 213. Referring to Fig. 28, the mounting of plate 458 on the swivel 213 includes an eye bolt 462 fixed to the top of plate 458 for rigidly supporting a shaft 463 extending downwardly into a bored opening 464 in the swivel 213. The bore 464 is counterbored at 465 and a gland 466, threaded in the top of counterbored portion 465, forms a slide bearing for the shaft 463. A pair of collars 467 surround the shaft 463 and they are mounted for free rotation and sliding movement thereon. The lower collar 467 abuts against the bottom of the counterbored portion 465 while the upper collar 467 bears against the lower end of the gland 466 and a shoulder formed by an enlarged portion 468 of shaft 463. A compression spring 469 surrounds the lower end of the shaft 463 and is located between the collars 467. The construction is such that the reciprocable plate 458 is resiliently urged towards a central position upon the release of a force that has moved it to either side of said central position.

Referring to Fig. 4, plate 458 is provided with a cam 470 having high portions on each side of a low portion. The spring 469 (Fig. 28) normally locates the plate 458 in a position where a roller on arm 460 of switch 461 is resiliently urged into the low portion of cam 470 normally holding the switch 461 open. Upon relatively slight rectilinear movement of plate 458 in either direction the arm 460 of switch 461 will be turned in a clockwise direction thereby closing the switch 461, energizing the circuit of the motor for the thrustor 452, and causing the feed-works to become disengaged from the screw 218 and shaft 220.

In the present embodiment of the invention the turret head $H_t$ consists of five tool-supporting stations each of which is adapted to support a tool for performing a specific working operation upon work mounted on the table W. It is desirable to provide a control between each of the specific tool stations of the turret head $H_t$ and the electric switch 461 so that upon indexing the turret, a separate control for each station may be effected. Referring to Figs. 4 and 18, the plate 458 is provided with five parallel grooves 471 adapted to receive abutment members 472 at both ends thereof. The abutment members 472 are adapted to be adjustably located along their grooves to control the stroke of the turret head $H_t$. A reciprocable arm 473, provided with a finger portion 474, is adapted to be selectively moved across the grooves 471 into position aligned with the abutments 472. Control of the reciprocation of the arm 473 is effected by the indexing of the turret head Ht. A cam groove 475 (Fig. 4) is provided on the back face of the turret head Ht adapted to receive a roller 476 mounted on the lower end of a reciprocable rod 477. The rod 477 is provided with a rack 478 at its upper end adapted to mesh with a gear 479 of a gear unit 480. The gear unit 480 is journaled on a stub shaft 481 (Fig. 18) and includes an additional gear 482 adapted to mesh with rack teeth 483 formed on the arm 473. The construction of the cam groove 475 is designed to cause reciprocation of the arm 473 to successively move the finger 474 of the rod 473 into aligned relation with the abutments 472 within the various grooves 471. In this manner, as the head Ht is indexed to bring successive tools into working engagement with the work, the finger automatically moves into alignment with the abutment 472 within the groove 471 corresponding to the station of the turret head that is in working position.

Several safety features are provided to prevent breakage of the actuating mechanism for the arm 473 in the event the operator inadvertently leaves an abutment 472 in position such that the finger 474 will engage its side as it moves across the plate 458, and in event that the finger 474 encounters an excessive load when it engages an abutment 472 as it moves in either direction with the head Ht. Referring to Fig. 18, finger 474 is pivotally mounted on a pin 484 extending across a bifurcated end portion of the rod 473. A spring-pressed detent 485 is adapted to cooperate with a notch in the side of the finger 474 to retain it against oscillatable movement about the pin 484. The finger is, therefore, mounted so that relative movement between it and the arm may be accomplished in one direction but not in the other. Accordingly, should the finger 474 engage the side of an abutment 472 while moving across the plate 458, it will merely pivot around the pin 484 and prevent breakage thereof. Manual re-setting of the finger 474 is necessary before it can be employed to reciprocate the plate 458.

The rack teeth 483 on the arm 473 extend peripherally about the arm and form another safety feature. A longitudinally-extending groove 486 (Fig. 27) is provided in the rod 473 into which a spring-pressed detent 487 is adapted to seat and to releasably retain the arm 473 against rotation. However, should the reciprocation of plate 458 require an excessive force, such that the finger 474 might be broken, the arm 473 will merely rotate about its longitudinal axis. Manual re-setting of the arm 473 can be effected by applying a wrench to the squared end 488 (Fig. 18) of the arm 473.

Referring again to Fig. 28, an angle member 489 is mounted at the top of the plate 458, to which a rod 490 is fixed in aligned relation with the arm 473. The construction and arrangement is such that if the finger 474 fails to engage an abutment 472, the upward travel of the turret or main head Ht would be limited by the engagement of arm 473 with rod 490 causing the plate 458 to be raised thereby closing the switch 461 to energize the motor circuit for the thrustor 452.

The foregoing describes apparatus for neutralizing the clutches of the feed-works Ft at predetermined limits of movement of head Ht along the bearings 211 of swivel 213 for each of the five stations of the turret head. The horizontal movement of head Ht is likewise adapted to be limited by a similar means. Although a feed knock-out plate having five grooves could be employed for the horizontal movement of head Ht, a plate 491 (Fig. 4) having a single groove 492 is preferably used. The plate 491 is attached to the cross-rail C in substantially the same manner that plate 458 is attached to swivel 213 (Fig. 28). Adjustable abutments 493 are mounted in the groove 492 and upon their engagement with a finger on the turret head Ht, a slight rectilinear movement of plate 491 will be effected causing actuation of a switch 494 on cross-rail C. Switch 494 is connected in parallel with the circuit for switch 461 and the motor for thrustor 452. Accordingly, the movement of the head Ht may be accurately stopped at predetermined points along either of its paths of movement.

Referring to Fig. 1, the feed knock-out Kr is substantially the same as Kt, except, a plate 495 having a single groove for adjustable abutments is attached to the swivel 238 (Fig. 18) in substantially the same way that plate 458 is connected to swivel 213 (Fig. 28). The slide 232 for the head Hr is provided with an arm 496 that is adapted to engage the abutments on plate 495 thereby to move it to actuate an electric switch 497 that energizes the circuit for an electric motor which latter operates a thrustor for feedworks Fr which thrustor is identical with the thrustor 452 for feed-works Ft. A similar means to that employed for limiting the horizontal movement of head Ht is used for the head Hr. It is associated with the switch 497 and causes neutralization of the clutches within the feed-works Fr when the head H2 arrives at predetermined points along its horizontal path of movement.

Referring to Fig. 4, the feed knock-out Ks includes a groove 498 in the slide 262 in which adjustable abutments 499 are located. A plate 500 connected to the table 258 is adapted to support an electric switch 501 in alignment with abutments 499. As the slide 262 reciprocates within the bearings of the table 258, it can be accurately stopped at pre-determined points by adjustably locating abutments 499 in groove 498. The switch 501 is in a circuit that includes a motor and thrustor for neutralizing the clutches of feed-works Fs in the same manner that thrustor 452 neutralizes the clutches of feed-works Ft.

Referring to Fig. 2, the vertical movement of the side head Hs is stopped at predetermined points by providing a normally open switch 502 thereon that is adapted to be closed by adjustable abutments 503 located within a grooved member 504 attached to the vertical slide bearing 260 on the rear of standard S. The switch 502 is connected in parallel with switch 501 for actuating the thrustor that neutralizes the clutches of feed-works Fs.

*Safety interlock*

Safety means is provided for preventing the cross-rail C moving upwardly or downwardly beyond pre-determined points. Additionally, means is provided for preventing the cross-rail approaching too close the side head Hs or the side head approaching too close the cross-rail.

Referring to Fig. 1, the left hand vertical shaft 322, to which the hand lever 323 is connected for shifting the clutch 315 (Fig. 19) within gear bracket G, is provided with fingers 505, 506.

These fingers are adapted to be engaged and moved to a position with shaft 322 neutralizing clutch 315 by fingers 507, 508 located on the top and bottom of the cross-rail C.

Referring to Fig. 2, the right-hand vertical shaft 322 is splined and a finger 509 is mounted thereon for movement with the cross-rail C. A finger 510 is mounted on table 258 of side head H₃ and in alignment with finger 509. Should the cross-rail C approach too closely to the side head H₃, the finger 510 will cause movement of finger 509 and shaft 322 to a position where clutch 315 will be neutralized.

Additionally, the switch 502 on the table 258 that controls the thrustor for neutralizing the clutches of feed-works F₈ is provided with a long actuating rod 511 having a surface 512 in line with a finger 513 on the under surface of the feed-works F₇. Should the side head H₃ approach dangerously close the cross-rail C, switch 502 will be closed by finger 513 engaging surface 512 of rod 511 whereupon, the clutches of feed-works F₈ will be instantly neutralized and side head H₃ stopped.

Although the various features of the improved machine tool have been shown and described in detail to fully disclose one embodiment of this invention, it will be evident that numerous changes may be made in such details, and certain features may be used without others, without departing from the principles of the invention.

What is claimed is:

1. A lathe comprising in combination a tool support; a work-supporting spindle; a variable-speed headstock transmission for rotating said spindle at a plurality of speeds; a shaft in driving engagement with said transmission at its power input side; a parallel shaft in driving engagement with said transmission adjacent its power output side, said parallel shafts being located within said lathe; a pair of parallel shafts on the outside of said lathe; means for transmitting the rotations of said pair of parallel shafts within said lathe to the pair of parallel shafts on the outside of said lathe; and a separate transmission in driving engagement with said tool support and adapted to be driven by said parallel shafts on the outside of said lathe.

2. A lathe comprising in combination, a standard; a housing; a work-supporting table journaled in said housing; a variable-speed transmission mounted within said standard for driving said table; a main tool support mounted on said standard; a side tool support mounted on said standard; a pair of parallel shafts within said standard and driven by said transmission, one adapted to be driven at a speed in proportion to the speeds at which said table is driven, and one adapted to be driven at a substantially constant speed; a pair of parallel shafts on the outside of said standard; means for transmitting the rotations of the parallel shafts within said standard to the additional pair of parallel shafts on the outside of said standard; and separate transmissions in driving relation with said tool supports and driven by the pair of shafts on the outside of said standard.

3. A lathe comprising in combination, a standard; a housing; a work-supporting table journaled in said housing; a variable-speed transmission mounted within said standard for driving said table; a cross-rail mounted transversely on said standard; a main tool support and a ram tool support mounted on the cross rail; a pair of parallel shafts within said standard and driven by said transmission, one adapted to be driven at a speed in proportion to the speeds at which said table is driven, and one adapted to be driven at a substantially constant speed; a pair of parallel shafts on the outside of said standard located on each side thereof; means for transmitting the rotations of the parallel shafts within said standard to said additional pairs of parallel shafts on the outside of said standard; and separate transmissions on each end of said cross-rail in driving engagement with said tool supports and driven by said pairs of parallel shafts on the outside of said standard.

4. A lathe comprising in combination, a standard; a housing; a work-supporting table journaled in said housing; a variable-speed transmission mounted within said standard for driving said table; a cross-rail mounted transversely of said standard; a ram tool support and a main tool support mounted on said cross rail; a side tool support mounted on the side of said standard; a pair of parallel shafts within said standard and driven by said transmission, one adapted to be driven at a speed in proportion to the speed at which said table is driven, and one adapted to be driven at a substantially constant speed; a pair of parallel shafts on the outside of said standard located on each side thereof; means for transmitting the rotations of the parallel shafts within said standard to the additional pairs of parallel shafts on the outside of said standard; separate transmissions on each end of said cross rail in driving engagement with said ram and main tool supports, respectively; a separate transmission in driving engagement with said side tool support; the transmission connected with the ram tool support being driven by one of said pairs of outside parallel shafts and both the transmissions for said main and side tool supports being driven by the other pair of outside parallel shafts.

5. A lathe comprising in combination, a standard; a work-supporting table; a transmission for rotating said table; a cross-rail mounted on said standard for movement therealong; a screw on either side of said standard in threaded engagement with said cross-rail; means driven by said transmission for simultaneously rotating said screws in either direction including a clutch; means for shifting said clutch into a neutral position upon movement of said cross-rail to predetermined positions along said standard, comprising an oscillatable shaft parallel with said screws; and means on said cross-rail adapted to engage means on said shaft for oscillating said shaft to shift said clutch into a neutral position.

6. A lathe comprising in combination, a standard; a work-supporting table; a transmission for rotating said table; a cross-rail mounted on said standard for movement therealong; a screw on either side of said standard in threaded engagement with said cross-rail; means for rotating said screws in either direction by said transmission including a clutch; clutch-shifting means comprising an oscillatable shaft parallel with and adjacent to one of said screws; a hand lever connected to said shaft; and means on the upper and lower sides of said cross-rail adapted to engage means adjustably mounted on said shaft for oscillating said shaft to shift said clutch into a neutral position.

7. A lathe comprising in combination, a standard; a work-supporting table; a transmission for rotating said table; a cross-rail mounted on said standard for movement therealong; a side head mounted on said standard adapted to be moved along said standard; screws located on each side of said strandard adapted to cooperate with said cross-rail; a shaft connected to said transmission at its input side; a shaft connected to said transmission at its output side; a reversing mechanism including a clutch between one of said shafts and said screws; a feed-works transmission connected to said side head and driven by another pair of shafts in driving engagement with the shafts connected to said table-rotating transmission for moving said side head along said standard; and separate means associated with said cross-rail and side head for neutralizing said clutch and for rendering said feedworks ineffective when said side head and cross-rail approach each other to within a predetermined distance.

8. A lathe comprising in combination, a standard; a work-supporting table; a transmission for rotating said table; a cross-rail mounted on said standard for movement therealong; a shaft connected to said transmission at its input side; a shaft connected to said transmission at its output side; a reversing mechanism; means including one of said shafts and said reversing mechanism for moving said cross-rail; a main tool head mounted on said cross-rail; a feedworks transmission connected to said cross-rail for moving said main tool head along intersecting paths; a side head tool support mounted on said standard; a feed-works transmission connected to said side head for moving it along intersecting paths; another pair of shafts in driving engagement with the shafts of said table-rotating transmission and in driving relation relatively to both of said feed-works transmissions; means associated with each of said tool heads for limiting its movement along said intersecting paths; and means between said cross-rail and said side head for automatically rendering ineffective the means for moving said cross-rail and the feedworks for said side head when said side head and cross-rail approach each other to within a predetermined distance.

9. A lathe comprising in combination, a standard; a work-supporting table; a transmission for rotating said table; a cross-rail mounted on said standard for movement therealong; a shaft connected to said transmission at its input side; a shaft connected to said transmission at its output side; a reversing mechanism; means including said reversing mechanism for moving said cross-rail; a main tool head and a ram tool head mounted on said cross-rail; a feed-works transmission connected to either side of said cross-rail for moving said main and ram tool heads along intersecting paths; a side head tool support mounted on said standard; a feed-works transmission connected to said side head for moving it along intersecting paths; a pair of shafts on each end of said cross-rail in driving engagement with the shafts of said table-rotating transmission for driving all of said feed-works transmissions; means associated with each of said tool heads for limiting its movement along said intersecting paths; adjustable means associated with said cross-rail for neutralizing said reversing mechanism when said cross-rail arrives at predetermined points in its travel along said standard; means on said side head for neutralizing said reversing mechanism when said cross-rail is moved to a predetermined point with respect to said side head; and means associated with the feed-works for said side head for rendering said side head feed-works ineffective when said side head is moved to a predetermined point with respect to said cross-rail.

10. In a machine tool, a work-supporting table adapted to be rotated at a plurality of speeds; a tool support; a feedworks for moving said tool support relatively to said work-supporting table; a headstock for operating said feedworks and for rotating said work-supporting table having less gears than the number of speeds at which said headstock is capable of rotating said work-supporting table; a pair of shafts, one connected to the input side, and one connected to the output side of said headstock; and another pair of shafts connected to said first-mentioned shafts and said feed-works, whereby said feed-works is supplied with two sources of rotative power from said headstock.

11. In a machine tool, a work-supporting table adapted to be rotated at a plurality of speeds; a tool support; a feedworks for moving said tool support relatively to said work-supporting table; a headstock for operating said feedworks and for rotating said work-supporting table having less gears than the number of speeds at which the headstock is capable of rotating said work-supporting table, said headstock including a driving shaft having a plurality of gears adapted to mesh with a like number of gears on a secondary shaft; a tertiary shaft having a plurality of gears mounted thereon and adapted to mesh with certain of said gears on said secondary shaft, at least one of said gears on said tertiary shaft being adapted to mesh with a gear on the secondary shaft which latter is adapted to mesh with a gear on said driving shaft; additional gears on said tertiary shaft adapted to mesh with a like number of gears on a driven shaft; means for selectively engaging certain of said gears to rotate said work-supporting table at a plurality of speeds; a pair of shafts, one connected to the input side, and one connected to the output side of said headstock; and another pair of shafts connected to said first-mentioned shafts and said feed-works, whereby said feed-works is supplied with two sources of rotative power from said headstock.

12. In a machine tool, a work-supporting table adapted to be rotated at a plurality of speeds; a tool support; a feedworks for moving said tool support relatively to said work-supporting table; a headstock for operating said feedworks and for rotating said work-supporting table having less gears than the number of speeds at which the headstock is capable of rotating said work-supporting table, said headstock including a driving shaft having a plurality of gears adapted to mesh with a like number of gears on a secondary shaft; a tertiary shaft having a plurality of gears mounted thereon and adapted to mesh with certain of said gears on said secondary shaft, at least one of said gears on said tertiary shaft being adapted to mesh with a gear on the secondary shaft which latter is adapted to mesh with a gear on said driving shaft; additional gears on said tertiary shaft adapted to mesh with a like number of gears on a driven shaft, said driven shaft being coaxial with said secondary shaft; means for engaging and disengaging said driven shaft with said secondary shaft; means for selectively engaging certain of said gears to rotate said work-supporting table at a plurality of speeds; a pair of shafts, one connected to the input side, and one connected to the output side of said headstock; and another pair of shafts connected to said first-mentioned shafts and said feed-works, whereby said feedworks is supplied with two sources of rotative power from said headstock.

13. In a machine tool, a work-supporting table adapted to be rotated; a tool support; a feedworks for moving said tool support relatively to said work-supporting table; a headstock for operating said feedworks and for rotating said work-supporting table at different speeds throughout a given range comprising a primary unit, a secondary unit, and a tertiary unit; each of said units including a plurality of gear combinations, any of which may be combined with any other, and at least one gear combination in two of said units having a common gear; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

14. In a machine tool, a work-supporting member adapted to be rotated; a tool support; a feedworks for moving said tool support relatively to said work-supporting member; a headstock for operating said feedworks and for rotating said work-supporting member at a relatively large number of different speeds throughout a given range comprising a primary unit, a secondary unit, and a tertiary unit; each of said units including a plurality of gear combinations adapted to be selectively engaged; means for engaging any gear combination within said units to produce any speed of rotation of said work-supporting member within said range independently of the gear combinations to produce any other speed of rotation within said range; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

15. In a machine tool a work-supporting table adapted to be rotated; a tool support; a feedworks for moving said tool support relatively to said work-supporting table; a headstock for operating said feedworks and for rotating said work-supporting table at a plurality of different speeds throughout a given range, including a primary unit, a secondary unit and a tertiary unit, each of said units including a plurality of gear combinations, a common shaft for supporting gears of said primary and secondary units, said tertiary unit including a driven shaft coaxial with said common shaft; means for selectively engaging and disengaging said gear combinations and said common and driven shafts; a pair of shafts, one connected ahead of said primary unit and the other connected after said tertiary unit; and another pair of shafts connected to said first-mentioned pair of shafts and to said feed works, whereby the latter is supplied with two sources of rotary power from said headstock.

16. In a machine tool a work-supporting table adapted to be rotated; a tool support; a feedworks for moving said tool support relatively to said work-supporting table; a headstock for operating said feedworks and for rotating said work-supporting table at a plurality of different speeds throughout a given range, including a primary unit, a secondary unit and a tertiary unit, each of said units including a plurality of gear combinations, a common shaft for supporting gears of said primary and secondary units and adapted to support a common gear between said primary and secondary units, said tertiary unit including a driven shaft coaxial with said common shaft; means for selectively engaging and disengaging said common and driven shafts; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

17. In a machine tool, a work-supporting table adapted to be rotated; a tool support; a feedworks for moving said tool support relatively to said work-supporting table; a headstock for operating said feedworks and for rotating said work-supporting table at different speeds throughout a given range comprising a primary unit, a secondary unit, and a tertiary unit; each of said units including a plurality of gear combinations, the ratio of any gear combination in the primary, secondary, and tertiary units of said headstock divided by the ratio of a gear combination in each of said respective units for producing the next lower speed in said respective units is respectively equal to the first, fourth, and eighth powers of the geometrical constant for said speed range; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

18. In a machine tool a work-supporting table adapted to be rotated; a tool support; a feedworks for moving said tool support relatively to said work-supporting table; a headstock for operating said feedworks and for rotating said work-supporting table at a plurality of different speeds throughout a given range, including a primary unit, a secondary unit and a tertiary unit, each of said units including a plurality of gear combinations, a common shaft for supporting gears of said primary and secondary units, said tertiary unit including a driven shaft coaxial with said common shaft; the ratio of any gear combination in the primary, secondary, and tertiary units of said headstock divided by the ratio of a gear combination in said respective units for producing the next lower speed in said respective units is respectively equal to the first, fourth and eighth powers of the geometrical constant for said speed range; means for selectively engaging and disengaging said gear combinations and said common and driven shaft; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

19. In a machine tool, a work-supporting table; a tool support; a feedworks for moving said tool support relatively to said table; a headstock for driving said feedworks and for rotating said table including a plurality of movable elements; means for moving said elements comprising an oscillatable axially-movable member; means associated with said member for moving one of said elements when said member is moved from its one axial limiting position to its other axial limiting position; means associated with said member for moving another of said elements when said member is substantially midway between its axial limiting positions and upon oscillation of said member; a pair of shafts, one connected to the input side, and one connected to the output side of said headstock; and another pair of shafts connected to said first-mentioned shafts and said feed-works, whereby said feedworks is supplied with two sources of rotative power from said headstock.

20. In a machine tool, a work-supporting table; a tool support; a feedworks for moving said tool support relatively to said table; a headstock for driving said feedworks and for rotating said table including a plurality of movable elements; means for moving said elements comprising an oscillatable axially-movable member; means associated with said member for moving one of said elements when said member is moved from its one axial limiting position to its other axial limiting position; means associated with said member for moving another of said elements when said member is oscillated; a pair of shafts, one connected to the input side, and one connected to the output side of said headstock; and another pair of shafts connected to said first-mentioned shafts and said feed-works, whereby said feed-works is supplied with two sources of rotative power from said headstock.

21. In a machine tool, a work-supporting table; a tool support; a feedworks for moving said tool support relatively to said table; a headstock for driving said feedworks and for rotating said table including a plurality of movable elements; means for moving said elements comprising an oscillatable axially-movable member; means associated with said member for moving one of said elements when said member is moved from its one axial limiting position to its other axial limiting position; means associated with said member for moving another of said elements when said member is in any of its axial positions and oscillated; means associated with said member for moving another of said elements when said member is midway between its axial limiting positions and oscillated; a pair of shafts, one connected to the input side, and one connected to the output side of said headstock; and another pair of shafts connected to said first-mentioned shafts and said feed-works, whereby said feedworks is supplied with two sources of rotative power from said headstock.

22. In a machine tool, a work-supporting table; a tool support; a feedworks for moving said tool support relatively to said table; a headstock for driving said feedworks and for rotating said table including a plurality of movable elements; means for moving said elements comprising a plurality of oscillatable axially-movable members; means associated with one of said members for engaging any one of a plurality of said elements upon axial movement of said member and for moving the element it engages upon oscillation of said member; means associated with the other member for moving one of said elements during its axial movement and at least one other element during its oscillation; a pair of shafts, one connected to the input side, and one connected to the output side of said headstock; and another pair of shafts connected to said first-mentioned shafts and said feed-works, whereby said feed-works is supplied with two sources of rotative power from said headstock.

23. In a machine tool, a work-supporting table; a tool support; a feedworks for moving said tool support relatively to said table; a headstock for driving said feedworks and for rotating said table including a plurality of movable elements; means for moving said elements comprising a plurality of oscillatable axially-movable members; means associated with one of said members for engaging any one of a plurality of said elements upon axial movement of said member and for moving the element it engages upon oscillation of said member; means associated with the other member for moving one of said elements during its axial movement, another element during its oscillation and still another element during its oscillation when said member is oscillated and substantially midway between its axial limits; a pair of shafts, one connected to the input side, and one connected to the output side of said headstock; and another pair of shafts connected to said first-mentioned shafts and said feed-works, whereby said feed-works is supplied with two sources of rotative power from said headstock.

24. In a machine tool comprising in combination, a rotatable work-supporting table; a tool support; a feedworks for moving said tool support relatively to said table; a headstock for driving said feedworks and for rotating said table at a plurality of speeds comprising in combination a driving and driven shaft; a primary, secondary and tertiary unit, each including a plurality of gear combinations between said driving and driven shafts; a direct drive between said primary unit and said driven shaft; means for engaging gear combinations in each said unit as well as for effecting engagement and disengagement of said direct drive, said means including a pair of axially-movable oscillatable members, one of which is adapted to control the engagement of gears in the primary and the other of which is adapted to control the engagement of gears in the secondary and tertiary units and to control the engagement and disengagement of said direct drive; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

25. In a machine tool comprising in combination, a rotatable work-supporting table; a tool support; a feedworks for moving said tool support relatively to said table; a headstock for driving said feedworks and for rotating said table at a plurality of speeds comprising in combination a driving and driven shaft; a primary, secondary and tertiary unit, each including a plurality of gear combinations between said driving and driven shafts; means for engaging gear combinations in each said unit, said means including a pair of axially-movable oscillatable members, one of which is adapted to control the engagement of gears in the primary and the other of which is adapted to control the engagement of gears in the secondary and tertiary units; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

26. In a machine tool, a work-supporting table adapted to be rotated at a plurality of speeds;

a tool support; a feedworks for moving said tool support relatively to said table; a headstock for driving said feedworks and for rotating said work-supporting table including a plurality of gear combinations; an oscillatable axially-movable member for controlling the operation of said headstock; means associated with said member for engaging a gear combination in either of its axial limiting positions; means associated with said member for engaging a cooperating gear combination while said member is in either of its axial limiting positions and upon oscillation of said member; means associated with said member for engaging another gear combination when said member is substantially midway between its axial limiting positions and upon oscillation of said member; a pair of shafts, one connected to the input side, and one connected to the output side of said headstock; and another pair of shafts connected to said first-mentioned shafts and said feed-works, whereby said feed-works is supplied with two sources of rotative power from said headstock.

27. In a machine tool, a work-supporting table adapted to be rotated at a plurality of speeds; a tool support; a feedworks for moving said tool support relatively to said table; a headstock for driving said feedworks and for rotating said table including a plurality of gear combinations and an engageable and disengageable direct drive; an oscillatable axially-movable member for controlling the operation of said headstock; means associated with said member for engaging a gear combination in either of its axial limiting positions and while in either of said postions for engagng a cooperating gear combination in either of its oscillatable positions; additional means associated with said member for engaging said direct drive when said member is oscillated while at a point substantially midway between its axial limiting positions; a pair of shafts, one connected to the input side, and one connected to the output side of said headstock; and another pair of shafts connected to said first-mentioned shafts and said feed-works, whereby said feed-works is supplied with two sources of rotative power from said headstock.

28. A machine tool comprising in combination, a work-supporting table; a tool support; a feedworks for moving said tool support relatively to said table; a headstock for driving said feedworks and for rotating said table including a plurality of gear combinations for rotating said work-supporting table at a plurality of speeds, said headstock including a plurality of shiftable means for engaging said gear combinations; a housing associated with said headstock; a plurality of elements within said housing and adapted to effect selective engagement of said variable-speed gear combinations; means for selectively moving said elements comprising a pair of axially shiftable oscillatable telescoping shafts; a pair of shafts, one connected to the input side, and one connected to the output side of said headstock; and another pair of shafts connected to said first-mentioned shafts and said feed-works, whereby said feed-works is supplied with two sources of rotative power from said headstock.

29. In a machine tool, a work-supporting table; a tool support; a feedworks for moving said tool support relatively to said table; a headstock for driving said feedworks and for rotating said work-supporting table at a plurality of speeds, including a plurality of gear combinations adapted to be selectively engaged; a housing associated with said headstock; a plurality of elements extending from within said housing to the outside thereof and adapted selectively to engage said plurality of gear combinations within the headstock; means for selectively moving said elements comprising a primary and a secondary member, said members being axially movable and oscillatable; common means on said primary member for moving certain of said elements upon oscillating movement being imparted to said primary member, and adapted to be selectively moved into operative position with respect to each of said certain elements upon axial movement of said primary member; the secondary member being provided with means for moving one of said elements upon movement of said secondary member from its one axial limiting position through a medial position to its other axial limiting position; means for moving other elements upon oscillatable movement of said secondary member, said last-mentioned means being effective to move at least one of said elements only when said secondary member is in its medial axial position; means for operating said members; a pair of shafts, one connected to the input side, and one connected to the output side of said headstock; and another pair of shafts connected to said first-mentioned shafts and said feed-works, whereby said feed-works is supplied with two sources of rotative power from said headstock.

30. In a machine tool, a work-supporting table; a tool support; a feedworks for moving said tool support relatively to said table; a headstock for driving said feedworks and for rotating said table including a plurality of movable elements; means for selectively moving said elements; a member; means for moving said member; means between said elements and member for preventing movement of said member until all of said elements are in predetermined position; a pair of shafts, one connected to the input side, and one connected to the output side of said headstock; and another pair of shafts connected to said first-mentioned shafts and said feed-works, whereby said feed-works is supplied with two sources of rotative power from said headstock.

31. In a machine tool, a work-supporting table; a tool support; a feedworks for moving said tool support relatively to said table; a headstock for driving said feedworks and for rotating said table including a plurality of movable elements; means for selectively moving said elements; a member; means for moving said member; means between said elements and member provided with an opening; means on said member for cooperating with said opening when the two are in alignment; means on said elements for preventing the alignment of the opening and the means on said member until said elements are in predetermined positions; a pair of shafts, one connected to the input side, and one connected to the output side of said headstock; and another pair of shafts connected to said first-mentioned shafts and said feed-works, whereby said feed-works is supplied with two sources of rotative power from said headstock.

32. In a machine tool, a work-supporting table; a tool support; a feedworks for moving said tool support relatively to said table; a headstock for driving said feedworks and for rotating said table including a plurality of movable elements having cam surfaces thereon; means for moving said elements; a member; means for moving said member; common means having cam surfaces adapted to cooperate with the cam surfaces on said elements and provided with an opening for receiving projecting means on said member when the opening and projecting means become aligned; means for resiliently urging said common means toward a position where said opening and projecting means become aligned; a pair of shafts, one connected to the input side, and one connected to the output side of said headstock; and another pair of shafts connected to said first-mentioned shafts and said feed-works, whereby said feed-works is supplied with two sources of rotative power from said headstock.

33. A machine tool comprising in combination, a work-supporting table; a tool support; a feedworks for moving said tool support relatively to said work-supporting table; a headstock for operating said feedworks and for rotating said work-supporting table comprising a plurality of gear combinations; a plurality of means for selectively engaging certain gear combinations; a main clutch for said headstock; a gear-shifting bracket associated with said headstock and including a plurality of elements associated with said gear-engaging means; means for selectively operating said elements; separate means for operating said main clutch; a member adapted to cooperate with all of said elements for preventing the engagement of said main clutch until said elements are in predetermined positions; means associated with said clutch-operating means adapted to cooperate with said member when said elements are in said predetermined positions to facilitate engagement of said main clutch; a pair of shafts, one connected to the input side, and one connected to the output side of said headstock; and another pair of shafts connected to said first-mentioned shafts and said feed-works, whereby said feed-works is supplied with two sources of rotative power from said headstock.

34. A machine tool comprising in combination, a work-supporting table; a tool support; a feedworks for moving said tool support relatively to said work-supporting table; a headstock for operating said feedworks and for rotating said work-supporting table comprising a plurality of gear combinations; a plurality of means for selectively engaging certain gear combinations; a main clutch for said headstock; a gear-shifting bracket associated with said headstock and including a plurality of elements associated with said gear-engaging means; means for selectively operating said elements; separate means for operating said main clutch; an apertured member adapted to cooperate with all of said elements for preventing the engagement of said main clutch until said elements are in predetermined positions; means associated with said clutch-operating means adapted to cooperate with the aperture in said member when said elements are in said predetermined positions to facilitate engagement of said main clutch; means for resiliently urging said member toward a position where its aperture will be in cooperative position with respect to the means associated with the clutch-operating means; a pair of shafts, one connected to the input side, and one connected to the output side of said headstock; and another pair of shafts connected to said first-mentioned shafts and said feed-works, whereby said feed-works is supplied with two sources of rotative power from said headstock.

35. In a machine tool, a work-supporting table; a tool support; a feedworks for moving said tool support relatively to said work-supporting table; a headstock comprising a plurality of gear combinations for operating said feedworks and for rotating said work-supporting table at a plurality of speeds; a plurality of means for selectively engaging certain of said gear combinations; a main clutch for said headstock; a plurality of racks connected to said gear-engaging means; means for selectively operating said racks; separate means for operating said main clutch; a lever connected to said main clutch operating means and adapted to abut against means for preventing permanent engagement of said main clutch until all of said racks are in predetermined positions; resilient means between said lever and abutment means for facilitating temporary engagement of said main clutch when said racks are not in said predetermined position; a pair of shafts, one connected to the input side, and one connected to the output side of said headstock; and another pair of shafts connected to said first-mentioned shafts and said feed-works, whereby said feed-works is supplied with two sources of rotative power from said headstock.

36. In a machine tool, a work-supporting table; a tool support; a feedworks for moving said tool support relatively to said work-supporting table; a headstock comprising a plurality of gear combinations for operating said feedworks and for rotating said work-supporting table at a plurality of speeds; a plurality of means for selectively engaging certain of said gear combinations; a main clutch for said headstock; a plurality of racks connected to said gear-engaging means; means for selectively operating said racks; separate means for operating said main clutch; a lever connected to said main clutch operating means and adapted to abut against a member that cooperates with all of said racks, said member having an aperture adapted to be aligned with said lever to effect the passage of the lever through said member when said racks are in predetermined position; a pair of shafts, one connected to the input side, and one connected to the output side of said headstock; and another pair of shafts connected to said first-mentioned shafts and said feed-works, whereby said feed-works is supplied with two sources of rotative power from said headstock.

37. In a machine tool, a work-supporting table; a tool support; a feedworks for moving said tool support relatively to said work-supporting table; a headstock including a driving and driven shaft for operating said feedworks and for rotating said work-supporting table at a plurality of speeds; primary, secondary and tertiary gear units between said driving and driven shafts; a direct drive between said primary unit and said driven shaft; means for selectively shifting the gears of said primary, secondary and tertiary units for driving said driven shaft at a plurality of speeds; means for selectively engaging and disengaging said direct drive; means for preventing the engagement of said direct drive except when the gear-shifting means of said tertiary unit is in a neutral position; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

38. In a machine tool, a work-supporting table; a tool support; a feedworks for moving said tool support relatively to said work-supporting table; a headstock including a driving and driven shaft for operating said feedworks and for rotating said work-supporting table at a plurality of speeds; primary, secondary and tertiary gear units between said driving and driven shafts; a direct drive between said primary unit and driven shaft; means for selectively shifting the gears of said primary and secondary units; means for shifting the gears of the tertiary unit comprising a member movable from one limiting position through a neutral position to another limiting position; means for engaging and disengaging the direct drive of the headstock including an element adapted to be moved at substantially right angles to the movement of the member for shifting the gears of the tertiary unit; means connected to said member adapted to cooperate with said element for preventing the movement of said element except when said member is in its neutral position; a pair of shafts, one connected ahead of said primary unit and the other connected after said tertiary unit; and another pair of shafts connected to said first-mentioned pair of shafts and to said feedworks, whereby the latter is supplied with two sources of rotary power from said headstock.

39. In a machine tool, a work support; a member adapted to be moved along intersecting paths relatively to said work support; a headstock for rotating said work support and for driving means for moving said member along said intersecting paths; a variable-speed transmission associated with said means including a driving, intermediate and driven shaft; a plurality of gears on said driving and intermediate shafts adapted to be selectively intermeshed; a plurality of gears on said driven shaft; a speed-reduction unit between said driving and driven shafts including a plurality of gears adapted to be selectively intermeshed with the gears on said driven shaft; a pair of shafts, one connected to the input side and the other connected to the output side of said headstock; another pair of shafts connected to said first-mentioned pair of shafts and to said member-moving means, one of said latter-mentioned shafts being adapted to supply rotary power to said variable-speed transmission and the other of said latter-mentioned shafts being adapted to supply another source of rotary power to said member-moving means.

40. In a machine tool, a work support; a member adapted to be moved along intersecting paths relatively to said work support; a headstock for rotating said work support and for driving means for moving said member along said intersecting paths; comprising a variable-speed transmission associated with said means including a driving, intermediate and driven shaft; means for driving said intermediate shaft at a plurality of speeds by intermeshing gears on said driving and intermediate shafts; a plurality of intermeshing speed-reduction gears on said driving and intermediate shafts adapted to reduce the speeds at which the intermediate shaft is adapted to be driven through a plurality of successive steps; gears on said driven shaft adapted to be selectively intermeshed with gears on the intermediate shaft at each of said successive steps; a pair of shafts, one connected to the input side and the other connected to the output side of said headstock; another pair of shafts connected to said first-mentioned pair of shafts and to said member-moving means, one of said latter-mentioned shafts being adapted to supply rotary power to said variable-speed transmission and the other of said latter-mentioned shafts being adapted to supply another source of rotary power to said member-moving means.

41. In a machine tool, a work support; a member adapted to be moved along intersecting paths relatively to said work support; a headstock for rotating said work support and for driving means for moving said member along said intersecting paths; comprising a variable-speed transmission associated with said means including a driving, intermediate and driven shaft; means for driving said intermediate shaft at a plurality of speeds by intermeshing gears on said driving and intermediate shafts; a plurality of constantly meshing speed-reduction gears on axes that are coaxial with the driving and intermediate shafts adapted to reduce the speeds at which the intermediate shaft is adapted to be driven through a plurality of successive steps; gears on said driven shaft adapted to be selectively intermeshed with gears on the intermediate shaft at each of said successive steps; a pair of shafts, one connected to the input side and the other connected to the output side of said headstock; another pair of shafts connected to said first-mentioned pair of shafts and to said member-moving means, one of said latter-mentioned shafts being adapted to supply rotary power to said variable-speed transmission and the other of said latter-mentioned shafts being adapted to supply another source of rotary power to said member-moving means.

42. In a machine tool, a work support; a member adapted to be moved along intersecting paths relatively to said work support; a headstock for rotating said work support and for driving means for moving said member along said paths; a variable-speed transmission associated with said means including a driving shaft having a plurality of selectively shiftable gear units splined thereto; a parallel intermediate shaft having a plurality of gear units keyed thereto; a plurality of constantly meshing gears journaled on extended portions of the driving and intermediate shafts one of which meshes with one of the gears keyed to the intermediate shaft; a driven shaft; a plurality of gears splined on said driven shaft and adapted to be selectively shifted into and out of mesh with certain of the gears on said intermediate shaft; a pair of shafts, one connected to the input side and the other connected to the output side of said headstock; another pair of shafts connected to said first-mentioned pair of shafts and to said member-moving means, one of said latter-mentioned shafts being adapted to supply rotary power to said variable-speed transmission and the other of said latter-mentioned shafts being adapted to supply another source of rotary power to said member-moving means.

43. In a machine tool, a work support; a member adapted to be moved along intersecting paths relatively to said work support; a headstock for rotating said work support and for driving a variable speed transmission for controlling the movement of said member along said intersecting paths, said variable speed transmission comprising in combination, separate rotatable shafts for moving said member along each of said paths; a driving shaft for each of said separate rotatable shafts; auxiliary shafts; a pair of shafts, one connected to the input side and the other connected to the output side of said headstock; another pair of shafts connected to said first-mentioned pair of shafts and to said auxiliary shafts for rotating means journaled on said driving shafts in opposite directions; and means for selectively engaging said oppositely rotatable means with said driving shafts.

44. In a machine tool, a work support; a member adapted to be moved along intersecting paths relatively to said work support; a headstock for rotating said work support and for driving a variable speed transmission for controlling the movement of said member along said intersecting paths, said variable speed transmission comprising in combination, separate rotatable shafts for moving said member along each of said paths; a driving shaft for each of said separate rotatable shafts; auxiliary shafts; variable-speed and substantially constant speed means a pair of shafts, one connected to the input side and the other connected to the output side of said headstock; another pair of shafts connected to said first-mentioned pair of shafts and to said variable and constant-speed means for rotating means journaled on said driving shafts in opposite directions; and means for selectively engaging said oppositely rotatable means with said driving shafts.

45. In a machine tool, a work support; a member adapted to be moved along intersecting paths relatively to said work support; a headstock for rotating said work support and for driving a variable speed transmission for controlling the movement of said member along said intersecting paths, said variable speed transmission comprising in combination, separate rotatable shafts for moving said member along each of said paths; a driving shaft for each of said separate rotatable shafts; auxiliary shafts; a pair of shafts, one connected to the input side and the other connected to the output side of said headstock; another pair of shafts connected to said first-mentioned pair of shafts and to relatively long, intermeshing, partially-overlapping gears journaled on said auxiliary shafts for rotating means journaled on said driving shafts in opposite directions; and means for selectively engaging said oppositely rotatable means with said driving shafts.

46. In a machine tool, a work support; a member adapted to be moved along intersecting paths relatively to said work support; a headstock for rotating said work support and for driving a variable speed transmission for controlling the movement of said member along said intersecting paths, said variable speed transmission comprising in combination, separate rotatable shafts for moving said member along each of said paths; a driving shaft for each of said separate rotatable shafts; auxiliary shafts; a pair of shafts, one connected to the input side and the other connected to the output side of said headstock; another pair of shafts connected to said first-mentioned paid of shafts and to relatively long, intermeshing, partially-overlapping gears journaled on said auxiliary shafts; a pair of gears on each driving shaft; one of the pair of gears on each driving shaft meshing with one, and the other of the pair of gears on each driving shaft meshing with the other of said gears on said auxiliary shafts.

47. In a machine tool, a work support; a member adapted to be moved along intersecting paths relatively to said work support; a headstock for rotating said work support and for driving a transmission for controlling the movement of said member along said intersecting paths, said transmission comprising in combination, separate rotatable shafts for moving said member along each of said paths; a driving shaft for each of said rotatable shafts; auxiliary shafts; a variable-speed transmission connected to means on said auxiliary shafts for rotating means journaled on said driving shafts in opposite directions; constant-speed transmission means connected to additional means on said auxiliary shafts for rotating additional means journaled on said driving shafts in opposite directions; means for selectively engaging any of said oppositely-rotatable means with said driving shafts; a pair of shafts, one connected to the input side and one connected to the output side of said headstock; and another pair of shafts connected to said first-mentioned pair of shafts and to said variable and constant-speed transmission means.

48. In a machine tool, a work support; a member adapted to be moved along a predetermined path relatively to said work support; a headstock for rotating said work support and for driving a transmission for controlling the movement of said member along said path, said transmission comprising a driving shaft; means for rotating said driving shaft comprising means journaled thereon and adapted to be rotated in opposite directions; a clutch for engaging said driving shaft with either of said oppositely-rotatable means; a hand wheel for manually rotating said driving shaft; a hand lever connected to a shaft extending through the axis of said hand wheel and adapted to shift said clutch to engage said driving shaft with either of said oppositely-rotatable means; a pair of shafts, one connected to the input side, and one connected to the output side of said headstock; and another pair of shafts connected to said first-mentioned shafts and said transmission, whereby said transmission is supplied with two sources of rotary power from said headstock.

49. In a machine tool, a work support; a member adapted to be moved along a predetermined path relatively to said work support; a headstock for rotating said work support and for driving a transmission for controlling the movement of said member along said predetermined path, said transmission comprising a driven shaft; a driving shaft; a variable-speed drive for rotating means journaled on said driving shaft in opposite directions at a plurality of speeds; a constant-speed drive for rotating separate means journaled on said driving shaft in opposite directions; clutches for connecting said driving shaft to any of said oppositely-rotatable means; means for selectively shifting said clutches; a pair of shafts, one connected to the input and the other connected to the output side of said headstock; and another pair of shafts connected to said first-mentioned pair of shafts and to said variable and constant speed drives.

50. In a machine tool, a work support; a member adapted to be moved along a predetermined path relatively to said work support; a headstock for rotating said work support and for driving a transmission for controlling the movement of said member along said predetermined path, said transmission comprising a driven shaft; a driving shaft; a variable-speed drive for rotating means journaled on said driving shaft in opposite directions at a plurality of speeds; a constant-speed drive for rotating separate means journaled on said driving shaft in opposite directions; clutches for connecting said driving shaft to any of said oppositely-rotatable means; a pair of axially aligned oscillatable sleeves having means for selectively moving said clutches upon oscillatable movement being imparted thereto; an axially-shiftable oscillatable shaft extending through said sleeves adapted to selectively engage either of said sleeves; a pair of shafts, one connected to the input and the other connected to the output side of said headstock; and another pair of shafts connected to said first-mentioned pair of shafts and to said variable and constant speed drives.

51. In a machine tool, a work support; a member adapted to be moved along a predetermined path relatively to said work support; a headstock for rotating said work support and for driving a transmission for controlling the movement of said member along said predetermined path, said transmission comprising a driven shaft; a driving shaft; a variable-speed drive for rotating means journaled on said driving shaft in opposite directions at a plurality of speeds; a constant-speed drive for rotating separate means journaled on said driving shaft in opposite directions; clutches for connecting said driving shaft to any of said oppositely-rotatable means; a pair of axially-aligned oscillatable sleeves having means for selectively shifting said clutches upon oscillatable movement being imparted thereto; an axially-shiftable oscillatable shaft extending through said sleeves; means on said axially-shiftable oscillatable shaft adapted to be selectively moved into and out of driving engagement with means on said sleeves; means for preventing the axial movement of said axially-shiftable oscillatable shaft when either of said clutches is engaged with any of said oppositely-rotatable means; a pair of shafts, one connected to the input and the other connected to the output side of said headstock; and another pair of shafts connected to said first-mentioned pair of shafts and to said variable and constant speed drives.

52. In a machine tool, a work support; a member adapted to be moved along intersecting paths relatively to said work support; a headstock for rotating said work support and for driving a transmission for controlling the movement of said member along said intersecting paths, said transmission comprising in combination, separate rotatable driven shafts for moving said member along said paths; a driving shaft for each of said driven shafts; a variable-speed transmission for rotating means journaled on each of said driving shafts in opposite directions at a plurality of speeds; a constant-speed drive for rotating separate means on each of said driving shafts in opposite directions at a substantially constant speed; clutches for connecting said driving shafts to any of said oppositely-rotatable means; means for selectively shifting said clutches; a pair of shafts, one connected to the input and the other connected to the output side of said headstock; and another pair of shafts connected to said first-mentioned pair of shafts and to said variable and constant speed drives.

53. In a machine tool, a work support; a member adapted to be moved along intersecting paths relatively to said work support; a headstock for rotating said work support and for driving a transmission for controlling the movement of said member along said intersecting paths, said transmission comprising in combination, separate rotatable driven shafts for moving said member along said paths; a driving shaft for each of said driven shafts; a variable-speed transmission for rotating means journaled on each of said driving shafts in opposite directions at a plurality of speeds; a constant-speed drive for rotating separate means on each of said driving shafts in opposite direction at a substantially constant speed; a pair of shafts, one connected to the input and the other connected to the output side of said headstock; another pair of shafts connected to said first-mentioned pair of shafts and to said variable and constant speed drives; clutches for connecting said driving shafts to any of said oppositely-rotatable means; a pair of axially-aligned sleeves for each of said driving shafts, each of said sleeves having means for selectively moving one of said clutches upon oscillatable movement being imparted to said sleeve and separate axially-shiftable oscillatable shafts extending through each pair of said sleeves, each shaft being adapted to selectively engage each sleeve of the pair through which it extends.

54. In a machine tool, a work support; a member adapted to be moved along intersecting paths relatively to said work support; a headstock for rotating said work support and for driving a transmission for controlling the movement of said member along said intersecting paths, said transmission comprising in combination, separate rotatable driven shafts for moving said member along said paths; a driving shaft for each of said driven shafts; a variable-speed transmission for rotating means journaled on each of said driving shafts in opposite directions at a plurality of speeds; a constant-speed drive for rotating separate means on each of said driving shafts in opposite directions at a substantially constant speed; a pair of shafts, one connected to the input and the other connected to the output side of said headstock; another pair of shafts connected to said first-mentioned pair of shafts and to said variable and constant speed drives; clutches for connecting said driving shafts to any of said oppositely-rotatable means; a pair of axially-aligned oscillatable sleeves for each of said driving shafts, each of said sleeves having means for selectively moving one of said clutches upon oscillatable movement being imparted to said sleeve, and separate axially-shiftable oscillatable shafts extending through each pair of said sleeves, means on said axially-shiftable oscillatable shafts adapted to be moved into and out of driving engagement with means on said sleeves; and means for preventing the axial movement of said axially-shiftable oscillatable shafts relative to the pair of sleeves through which it extends when either of the clutches controlled by said pair of sleeves is in engagement with any of said oppositely rotatable means.

55. In a machine tool, a work support; a memmer adapted to be moved along a predetermined path relatively to said work support; a headstock for rotating said work support and for driving a transmission for controlling the movement of said member along said predetermined path, said transmission comprising in combination a driven shaft; separate means for driving said driven shaft at a constant and at a variable speed in either direction; a pair of shafts, one connected to the input and the other connected to the output side of said headstock; another pair of shafts connected to said first-mentioned pair of shafts and to said separate means; clutches for establishing either of said drives; means for shifting said clutches; a hand wheel for manually rotating the driven shaft in either direction and means for rendering said hand wheel ineffective when one of said separate speeds for driving said driven shaft is established by the shifting of one of said clutches.

56. In a machine tool, a work support; a member adapted to be moved along a predetermined path relatively to said work support; a headstock for rotating said work support and for driving a transmission for controlling the movement of said member along said predetermined path, said transmission comprising in combination a driven shaft; separate means for driving said driven shaft at a constant and at a variable speed in either direction; a pair of shafts, one connected to the input and the other connected to the output side of said headstock; another pair of shafts connected to said first-mentioned pair of shafts and to said separate means; clutches for establishing either of said drives; axially-aligned oscillatable sleeves through which an axially-shiftable oscillatable shaft is adapted to pass; a hand wheel journaled on said axially-shiftable shaft and adapted to be axially moved into clutching engagement with means for rotating said driven shaft; and means for rendering said hand wheel ineffective comprising means on said axially-shiftable shaft adapted to cooperate with said hand wheel upon axial movement of said shiftable shaft in one direction to move said hand wheel out of clutching engagement with the means for rotating said driven shaft.

57. In a machine tool, a work support; an implement adapted to be moved along a predetermined path relatively to said work support; a headstock for rotating said work support and for driving a variable-speed transmission for controlling the movement of said implement; a shaft connected to the output side of said headstock and to said variable-speed transmission, said variable speed transmission comprising a plurality of shiftable gear units; means for selectively shifting said gear units comprising a plurality of axially-shiftable elements; an axially-shiftable oscillatable member adapted in each of its axial positions selectively to engage said elements; a plate adjacent said member having a plurality of slots on each side of said member; and means on said member adapted to cooperate with the slots in said plate.

58. In a machine tool, a work support; an implement adapted to be moved along a predetermined path relatively to said work support; a headstock for rotating said work support and for driving a variable-speed transmission for controlling the movement of said implement; a shaft connected to the output side of said headstock and to said variable-speed transmission, said variable speed transmission comprising a plurality of shiftable gear units; means for selectively shifting said gear units comprising a plurality of axially-shiftable elements; an axially shiftable oscillatable member adapted in each of its axial positions selectively to engage said elements; a plate adjacent said member having a plurality of slots on each side of said member; means on said member adapted to cooperate with the slots in said plate; and means axially movable with said member for locking the element not engaged by said member.

59. In a machine tool, a work support; an implement adapted to be moved along a predetermined path relatively to said work support; a headstock for rotating said work support and for driving a variable-speed transmission for controlling the movement on said implement; a shaft connected to the output side of said headstock and to said variable-speed transmission, said variable speed transmission comprising a plurality of sets of shiftable gear units; means for selectively shifting said gear units comprising a pair of axially shiftable elements for each set of said shiftable gear units; an axially-shiftable oscillatable member for each pair of shiftable elements; means on each of said members for selectively engaging each element of the pair of elements with which the member cooperates; and means axially movable with each of said members adapted to lock the element not engaged by the member.

60. In a machine tool, a work support; an implement adapted to be moved along a predetermined path relatively to said work support; a member adapted to be rotated in opposite directions for controlling the movement of said implement; a headstock for rotating said work support and for driving a transmission for controlling the rotation of said member; a shaft connected to the output side of said headstock and to said transmission, said transmission including a clutch adapted to be shifted from one axial position where said member is rotated in one direction to another axial position where said member is rotated in the opposite direction; means for shifting said clutch between said axial positions; and a member adapted to cooperate with said clutch-shifting means to position said clutch substantially mid-way between said axial positions.

61. In a machine tool, a work support; an implement adapted to be moved along a predetermined path relatively to said work support; a member adapted to be rotated in opposite directions for controlling the movement of said implement; a headstock for rotating said work support and for driving a transmission for controlling the rotation of said member; a shaft connected to the output side of said headstock and to said transmission, said transmission including a clutch adapted to be shifted from one axial position where said member is rotated in one direction to another axial position where said member is rotated in the opposite direction; oscillatable means for shifting said clutch comprising a sleeve; a pair of abutments located on opposite sides of means adapted to cooperate with said sleeve; and a reciprocable member adapted to cooperate with said abutments for positioning said sleeve so that said clutch is moved to a point substantially mid-way between said axial positions.

62. In a machine tool, a work support; an implement adapted to be moved along a predetermined path relatively to said work support; a headstock for rotating said work support and for driving a transmission adapted to control the movement of said implement; a pair of shafts, one connected to the input and the other connected to the output side of said headstock; another pair of shafts connected to said first-mentioned pair of shafts and to said transmission, said transmission including a plurality of clutches each adapted to be shifted between two axial positions for controlling the movement of said implement; separate means for shifting each of said clutches between their axial positions; and a member adapted to cooperate with said clutch-shifting means to position said clutches substantially midway between their axial positions when said implement reaches one or more points in its path of travel.

63. In a machine tool, a work support; an implement adapted to be moved along a predetermined path relatively to said work support; a headstock for rotating said work support and for driving a transmission adapted to control the movement of said implement; a pair of shafts, one connected to the input and the other connected to the output side of said headstock; another pair of shafts connected to said first-mentioned pair of shafts and to said transmission, said transmission including a plurality of clutches mounted on a single shaft and adapted to be shifted between two axial positions for controlling the movement of said implement; separate aligned means for shifting each of said clutches between their axial positions; and a member adapted to cooperate with said clutch-shifting means to position said clutches substantially midway between their axial positions when said implement reaches one or more points in its path of travel.

64. In a machine tool, a work support; an implement adapted to be moved along a predetermined path relatively to said work support; a headstock for rotating said work support and for driving a transmission adapted to control the movement of said implement; a pair of shafts, one connected to the input and the other connected to the output side of said headstock; another pair of shafts connected to said first-mentioned pair of shafts and to said transmission, said transmission including a plurality of clutches mounted on parallel spaced shafts and adapted to be shifted between two axial positions for controlling the movement of said implement; separate means arranged along parallel spaced axes for shifting each of said clutches between their axial positions; and a member adapted to cooperate with said clutch-shifting means to position said clutches substantially midway between their axial positions when said implement reaches one or more points in its path of travel.

65. In a machine tool, a work support; an implement adapted to be moved along a predetermined path relatively to said work support; a headstock for rotating said work support and for driving a transmission for controlling the movement of said implement; a pair of shafts, one connected to the input and the other connected to the output side of said headstock; another pair of shafts connected to said first-mentioned pair of shafts and to said transmission, said transmission including a plurality of clutches adapted selectively to be shifted between two axial positions; separate oscillatable means for shifting said clutches between said axial positions; a common oscillatable element adapted to be selectively connected to and disconnected from said separate oscillatable means; means for preventing disconnecting said common element from either of said oscillatable means until the latter is in position to locate its corresponding clutch substantially midway between its axial positions; and a reciprocable member adapted to cooperate with means on said common element for positioning the clutch in engagement therewith substantially midway between its axial positions when said implement reaches one or more predetermined positions in its path of travel.

66. In a machine tool, a work support; an implement adapted to be moved along a predetermined path relatively to said work support; a headstock for rotating said work support and for driving a transmission for controlling the movement of said implement; a pair of shafts, one connected to the input and the other connected to the output side of said headstock; another pair of shafts connected to said first-mentioned pair of shafts and to said transmission, said transmission including a plurality of clutches adapted selectively to be shifted between two axial positions; a pair of axially-aligned sleeves having peripheral cam grooves; arms connected to said clutches and provided with rollers for cooperating with said cam grooves; a common oscillatable element adapted to be selectively connected to and disconnected from said sleeves; means for preventing the disconnection of said common element from either of said sleeves until the latter is in position to locate its corresponding clutch substantially midway between its axial positions; and a reciprocable member adapted to cooperate with means on said common elements for positioning the clutch in engagement therewith substantially midway between its axial positions when said implement reaches one or more predetermined positions in its path of travel.

67. In a machine tool, a work support; an implement adapted to be moved along intersecting paths relatively to said work support; a headstock for rotating said work support and for driving a transmission for controlling the movement of said implement along said intersecting paths, said transmission including a driven shaft for each path along which said implement is adapted to be moved; a driving shaft for each of said driven shafts; oppositely rotatable means on each of said driving shafts adapted to be rotated at a plurality of relatively slow speeds, and at a substantially constant relatively rapid speed; a pair of shafts, one connected to the input and the other to the output side of said headstock; another pair of shafts connected to said first-mentioned pair of shafts and to said transmission for providing said relatively slow variable-speed and rapid constant speed; two pairs of clutches, each clutch being adapted to be shifted between two axial positions and a pair of said clutches being mounted on each of said driving shafts; separate oscillatable elements for shifting each of said clutches between their axial positions; the oscillatable elements for each pair of said clutches being in aligned relation and each aligned pair of said elements being arranged along parallel spaced axes; means common to each pair of said oscillatable elements adapted to be selectively connected to, and disconnected from the respective oscillatable elements of its pair; and a reciprocable member adapted to cooperate with means on both of said common means for positioning the clutches substantially midway of their axial position.

68. In a machine tool, a work support; an implement adapted to be moved along a predetermined path relatively to said work support; a headstock for rotating said work support and for driving a transmission for controlling the movement of said implement; a pair of shafts, one connected to the input and the other connected to the output side of said headstock; another pair of shafts connected to said first-mentioned pair of shafts and to said transmission, said transmission including a driving shaft; a driven shaft; gearing for transmitting power from said driving shaft to said driven shaft including means for rotating said driven shaft in opposite directions; a clutch for selectively engaging said driven shaft with said oppositely-rotatable means; oscillatable means for shifting said clutch from one axial position through a neutral position to another axial position; a reciprocable member adapted to cooperate with said oscillatable means; and a fluid-operated thrustor for actuating said reciprocable member.

69. In a machine tool, a work support; an implement adapted to be moved along a predetermined path relatively to said work support; a headstock for rotating said work support and for driving a transmission for moving said implement; a shaft connected to the output side of said headstock and to said transmission, said transmission including a driven shaft adapted to be rotated in opposite directions by said headstock shaft; a clutch for connecting said driven shaft to, and for disconnecting said driven shaft from oppositely rotatable means within said transmission; oscillatable means for shifting said clutch from one axial position, through neutral, to another axial position; a reciprocable member adapted to cooperate with means associated with said oscillatable means for moving said oscillatable means to shift said clutch into neutral; and means operated by said implement for actuating said reciprocable member.

70. In a machine tool, a work support; an implement adapted to be moved along a predetermined path relatively to said work support; a headstock for rotating said work support and for driving a transmission for moving said implement; a shaft connected to the output side of said headstock and to said transmission, said transmission including a driven shaft adapted to be rotated in opposite directions by said headstock shaft; a clutch for connecting said driven shaft to, and for disconnecting said driven shaft from oppositely rotatable means within said transmission; oscillatable means for shifting said clutch from one axial position, through neutral, to another axial position; a reciprocable member adapted to cooperate with means associated with said oscillatable means for moving said oscillatable means to shift said clutch into neutral; and adjustable abutments located along the path of movement of said implement adapted to operate said reciprocable member.

71. In a machine tool, a work support; an implement adapted to be moved along a predetermined path relatively to said work support; a headstock for rotating said work support and for driving a transmission for moving said implement; a shaft connected to the output side of said headstock and to said transmission, said transmission including a driven shaft adapted to be rotated in opposite directions by said headstock shaft; a clutch for connecting said driven shaft to, and for disconnecting said driven shaft from oppositely rotatable means within said transmission; oscillatable means for shifting said clutch from one axial position, through neutral, to another axial position; a reciprocable member adapted to cooperate with means associated with said oscillatable means for moving said oscillatable means to shift said clutch into neutral; and electrically-operated means for actuating said reciprocable member.

72. In a machine tool, a work support; an implement adapted to be moved along a predetermined path relatively to said work support; a headstock for rotating said work support and for driving a transmission for moving said implement; a shaft connected to the output side of said headstock and to said transmission, said transmission including a driven shaft adapted to be rotated in opposite directions by said headstock shaft; a clutch for connecting said driven shaft to, and for disconnecting said driven shaft from oppositely rotatable means within said transmission; oscillatable means for shifting said clutch from one axial position, through neutral, to another axial position; a reciprocable member adapted to cooperate with means associated with said oscillatable means for moving said oscillatable means to shift said clutch into neutral; a reciprocable plate having a groove in which abutments are adapted to be adjustably located along the path of movement of said implement; an arm connected to said implement adapted to engage said abutments for moving said plate; and means operated by movement of said plate for actuating said reciprocable member to shift said clutch into neutral.

73. In a machine tool, a work support; an implement adapted to be moved along intersecting paths relatively to said work support; a headstock for rotating said work support and for driving a transmission for controlling the movement of said implement; a shaft connected to the output side of said headstock and to said transmission, said transmission including separate driven shafts for moving said implement along each of said paths; means including said headstock shaft for rotating said driven shafts in opposite directions; clutches on each of said driven shafts adapted to be moved from one axial position through neutral to another axial position for connecting said driven shafts to, and for disconnecting said driven shafts from said transmission; separate oscillatable means for shifting each of said clutches between their axial positions; and a reciprocable member adapted to cooperate with means associated with said separate oscillatable means for shifting the clutches into neutral.

74. In a machine tool, a work support; a rotatable turret head adapted to be moved along a predetermined path relatively to said work support; a headstock for rotating said work support and for driving means for moving said turret head along said path; means for rendering said turret-moving means ineffective comprising a reciprocable plate; a plurality of abutment members adjustably mounted on said plate in spaced relation; means for indexing said turret-head; a cam groove on one face of said turret head; and means adapted to be selectively moved into aligned relation with preselected abutments on said plate comprising an arm adapted to support a roller in engagement with said cam groove.

75. In a machine tool, a work support; a rotatable turret head adapted to be moved along a predetermined path relatively to said work support; a headstock for rotating said work support and for driving means for moving said turret head along said path; means for rendering said turret-moving means ineffective comprising a reciprocable plate; a plurality of abutment members adjustably mounted on said plate in spaced relation; means for indexing said turret-head; a cam groove on one face of said turret head; means adapted to be moved into aligned relation with said abutment members comprising a shaft having a finger mounted thereon for cooperation with said abutments; and means for supporting said finger for relative movement in one direction with respect to said shaft and for preventing relative movement of said finger relative to said shaft in another direction.

76. In a machine tool, a work support; a rotatable turret head adapted to be moved along a predetermined path relatively to said work support; a headstock for rotating said work support and for driving means for moving said turret head along said path; means for rendering said turret-moving means ineffective comprising a reciprocable plate; a plurality of abutment members adjustably mounted on said plate in spaced relation; means for indexing said turret-head; a cam groove on one face of said turret head;

means adapted to be moved into aligned relation with said abutment members comprising a shaft having a finger pivotally mounted thereon; and a spring-pressed detent for releasably holding said finger in a predetermined position relative to said shaft.

77. In a machine tool, a work support; a rotatable turret head adapted to be moved along a predetermined path relatively to said work support; a headstock for rotating said work support and for driving means for moving said turret head along said path; means for rendering said turret-moving means ineffective comprising a reciprocable plate; a plurality of abutment members adjustably mounted on said plate in spaced relation; means for indexing said turret-head; a cam groove on one face of said turret head; means adapted to be selectively moved into aligned relation with preselected abutment members on said plate comprising a shaft having rack teeth adapted to mesh with a pinion driven by a reciprocable rod having a roller in engagement with said cam groove.

78. In a machine tool, a work support; a rotatable turret head adapted to be moved along a predetermined path relatively to said work support; a headstock for rotating said work support and for driving means for moving said turret head along said path; means for rendering said turret-moving means ineffective comprising a reciprocable plate; a plurality of abutment members adjustably mounted on said plate in spaced relation; means for indexing said turret-head; a cam groove on one face of said turret head; means adapted to be selectively moved into aligned relation with preselected abutment members on said plate comprising a shaft having rack teeth adapted to mesh with a pinion driven by a reciprocable rod having a roller in engagement with said cam groove, each of said rack teeth extending peripherally about said shaft; and releasable means for normally preventing rotation of said shaft, but permitting said shaft to turn upon its encountering an excessive load.

79. In a machine tool, a work support; an implement; means for moving said implement along intersecting paths relatively to said work support; a headstock for rotating said work support and for driving a transmission; a shaft connected to the output side of said headstock and to said transmission, said transmission including a separate shaft for moving said implement along each of said paths; means for rotating said shafts in opposite directions by said headstock shaft; clutches on each of said shafts adapted to connect said shafts with, and to disconnect said shafts from oppositely rotatable means within said transmission; oscillatable means for shifting said clutches; a reciprocable element parallel with each of said paths; means upon said implement for engaging said reciprocable element; and means operated by movement of said reciprocable element for actuating a reciprocable member adapted to cooperate with said oscillatable means to shift said clutches into neutral.

80. In a machine tool, a work support; an implement; means for moving said implement along intersecting paths relatively to said work support; a headstock for rotating said work support and for driving a transmission; a shaft connected to the output side of said headstock and to said transmission, said transmission including a separate shaft for moving said implement along each of said paths; means for rotating said shafts in opposite directions by said headstock shaft; clutches on each of said shafts adapted to connect said shafts with, and to disconnect said shafts from oppositely rotatable means within said transmission; oscillatable means for shifting said clutches; a reciprocable element parallel with each of said paths; means upon said implement for engaging said reciprocable element; and means for shifting said clutches into neutral comprising a fluid-operated thrustor adapted to be electrically controlled.

81. In a machine tool, a work support; an element adapted to be moved along a predetermined path relatively to said work support; a headstock for rotating said work support and for driving a transmission for controlling the movement of the element along said path; a shaft connected to the output side of said headstock and to said transmission, said transmission including a clutch adapted to be shifted from one axial position to another axial position for changing the direction of movement of said element along said path; manually-operated means for shifting said clutch from its one axial position to its other axial position; and fluid-operated means for shifting said clutch to a point substantially midway between said axial positions when said element reaches one or more predetermined points along said path.

82. Apparatus comprising in combination, a work support; a member adapted to be moved along a predetermined path relatively to said work support; a headstock for rotating said work support and for driving a transmission for moving said member in either direction along said path; a shaft connected to the output side of said headstock and to said transmission, said transmission including a driven shaft adapted to be rotated in opposite directions by said headstock shaft; a clutch for connecting said driven shaft to and for disconnecting said driven shaft from said transmission; oscillatable means for shifting said clutch between two axial positions from engagement with one portion, through neutral, to engagement with another portion of said transmission; a reciprocable member adapted to cooperate with means associated with said oscillatable means for moving said oscillatable means to shift said clutch into neutral; and fluid-operated thrustor means rendered effective by said member for actuating said reciprocable member.

83. Apparatus comprising in combination, a work support; a member adapted to be moved along a predetermined path relatively to said work support; a headstock for rotating said work support and for driving a transmission for moving said member in either direction along said path; a pair of shafts, one connected to the input and the other connected to the output side of said headstock; another pair of shafts connected to said first-mentioned pair of shafts and to said transmission, said transmission including a driven shaft adapted to be rotated in opposite directions at a plurality of separate relatively slow speeds and at a substantially constant relatively fast speed; clutches for selectively connecting said driven shaft to and disconnecting said driven shaft from the variable-speed portion and the substantially constant-speed portion of said transmission; separate oscillatable means for shifting each of said clutches from one axial position through neutral to another axial position; reversible gearing adapted to be engaged by said clutches in either of its axial positions of movement; common oscillatable means adapted to be selectively engaged to, and disengaged from said separate oscillatable means; means for preventing disengagement of said common means from either of said separate oscillatable means until the latter is in position to locate its corresponding clutch in neutral; and a reciprocable member adapted to cooperate with means on said common means for shifting the clutch in engagement with said common means into neutral.

84. A machine tool comprising in combination, a work support; a rotatable turret head adapted to be moved along a predetermined path relatively to said work support; a headstock for rotating said work support and for driving a transmission for moving said turret head along said path, said transmission including a driven shaft adapted to be rotated in opposite directions; a clutch for engaging said driven shaft with, and for disengaging said driven shaft from oppositely rotatable means; oscillatable means for shifting said clutch; a reciprocable plate; a plurality of abutment members adjustably mounted on said plate in spaced relation; means for indexing said turret head; a cam groove on one face of said turret head; means adapted to be selectively moved into aligned relation with preselected abutments on said plate comprising an arm adapted to support a roller in engagement with said cam groove; and means operable upon engagement between said selectively-movable means and said abutment members for oscillating said oscillatable means to shift said clutch to a neutral position.

85. In a machine tool, a work support; a turret adapted to be moved along intersecting paths; a headstock for rotating said work support; a transmission for moving said turret along said paths; means for connecting said transmission to said turret; means for indexing said turret; means for positioning an element movable with said turret along both of said paths in cooperative position relatively to adjustable means movable with said turret along only one of its paths; and means for disconnecting said transmission from said turret including an electrical circuit responsive to the movement of said turret.

86. A machine tool comprising in combination, a frame; a work-supporting table journaled in said frame; a tool support adapted to be indexed from station to station and mounted on said frame for rectilinear movement along intersecting paths; a headstock transmission for rotating said table and having less gears than the number of speeds at which it is capable of rotating said table, said headstock being mounted substantially wholly within said transmission and provided with means for preventing tortional twisting thereof; means for controlling the operation of said headstock including an oscillatable axially-movable member; separate shafts for each path along which said tool support is adapted to be moved; a feedworks transmission driven by said headstock transmission and including oppositely rotatable means for controlling the rotation of said separate shafts; variable and constant speed gearing adapted to rotate said oppositely-rotatable means; axially-shiftable clutches for connecting and disconnecting said variable and constant speed gearing to either of said separate shafts; separate means for shifting each of said clutches between its axial positions; and means adapted to cooperate with said clutch-shifting means to position each of said clutches substantially midway between its axial positions, said last-mentioned means being responsive to various positions the tool support may assume along its intersecting paths.

EDWARD P. BULLARD, III.
FRANK H. MUSSLER.
PAUL H. LANGE.
EDWARD N. COWELL.
LEROY E. ALVEY.